United States Patent
Luebke et al.

(10) Patent No.: US 9,150,740 B2
(45) Date of Patent: Oct. 6, 2015

(54) FILM FORMING COATING COMPOSITIONS CONTAINING CARBOXAMIDE COALESCING SOLVENTS AND METHODS OF USE

(75) Inventors: Gary Luebke, Chicago, IL (US); Renee Luka, Park Ridge, IL (US); Andrew D. Malec, Chicago, IL (US); Michael R. Terry, Gurnee, IL (US); Patrick Shane Wolfe, Palatine, IL (US)

(73) Assignee: Stepan Company, Northfield, IL (US)

( * ) Notice: Subject to any disclaimer, the term of this patent is extended or adjusted under 35 U.S.C. 154(b) by 175 days.

(21) Appl. No.: 13/699,280

(22) PCT Filed: May 23, 2011

(86) PCT No.: PCT/US2011/037541
§ 371 (c)(1),
(2), (4) Date: Feb. 22, 2013

(87) PCT Pub. No.: WO2011/149830
PCT Pub. Date: Dec. 1, 2011

(65) Prior Publication Data
US 2013/0143986 A1   Jun. 6, 2013

Related U.S. Application Data

(60) Provisional application No. 61/396,252, filed on May 25, 2010.

(51) Int. Cl.
 *C09D 7/12* (2006.01)
 *C08J 5/18* (2006.01)
 *C09D 167/08* (2006.01)
 *C09J 167/08* (2006.01)

(52) U.S. Cl.
 CPC .............. *C09D 7/1233* (2013.01); *C08J 5/18* (2013.01); *C09D 167/08* (2013.01); *C09J 167/08* (2013.01)

(58) Field of Classification Search
 CPC ...... C09D 7/12; C09D 151/00; C09D 167/08; C08J 5/18; C08J 167/08
 USPC ..................... 524/94, 230; 427/340
 See application file for complete search history.

(56) References Cited

U.S. PATENT DOCUMENTS

| | | | | |
|---|---|---|---|---|
| 4,001,181 | A | * | 1/1977 | Ramey et al. ............... 524/91 |
| 4,148,948 | A | | 4/1979 | Williams et al. |
| 4,332,737 | A | | 6/1982 | Manos |
| 5,250,108 | A | * | 10/1993 | Tanaka et al. ............. 106/31.18 |
| 5,399,544 | A | | 3/1995 | Maywald et al. |
| 7,705,081 | B2 | | 4/2010 | Porzio et al. |
| 7,705,082 | B2 | | 4/2010 | Porzio et al. |
| 7,939,601 | B1 | | 5/2011 | Bergeron et al. |
| 2003/0073689 | A1 | * | 4/2003 | Senee ......................... 514/241 |
| 2003/0219398 | A1 | | 11/2003 | Loffler et al. |
| 2009/0151601 | A1 | | 6/2009 | Mangnus et al. |

FOREIGN PATENT DOCUMENTS

| | | |
|---|---|---|
| CN | 101637705 | 2/2010 |
| EP | 0609756 | 8/1994 |
| EP | 609756 A2 * | 8/1994 |
| WO | 0144330 | 6/2001 |
| WO | WO-2008063829 | 5/2008 |
| WO | WO-2009092795 | 7/2009 |

* cited by examiner

*Primary Examiner* — Michael M Bernshteyn
(74) *Attorney, Agent, or Firm* — Dilworth IP LLC

(57) ABSTRACT

A film may be formed from film forming compositions which comprise at least one carboxamide based coalescing solvent. These coalescing solvents impart equivalent or improved wet-scrub resistance, block resistance, gloss, dirt pick-up resistance and leveling characteristics to the films on a substrate, without contributing to total VOC levels, when replacing conventional coalescing solvents. The present invention also includes a method for forming a film comprising applying a film forming composition comprising polyunsaturated reactive carboxamides to a substrate and curing the film under ambient conditions. The coalescing carboxamide solvents are suitable for paint, latex based caulk, adhesives and floor care applications.

23 Claims, 6 Drawing Sheets

FILM FORMING COATING COMPOSITIONS CONTAINING CARBOXAMIDE COALESCING SOLVENTS AND METHODS OF USE

FIELD OF THE INVENTION

This invention relates to the use of carboxamide coalescing solvents in film forming compositions, e.g., paints and floor care products, and to methods of making a film by applying the film forming compositions to a substrate.

BACKGROUND OF THE INVENTION

Water-based paints are generally composed of aqueous dispersions of polymers and pigments that impart opacity, water resistance, and durability to the dry paint film. The polymers and pigments are dispersed in the liquid paint as discrete particles. Generally, the dispersed polymers comprise the film forming, adhesive portions of the paint. Latex polymers can be prepared by free radical emulsion polymerization processes. Stabilization of the resulting polymer latex particles is achieved by including surfactants in the polymerization reaction. The polymers can also be made from alkyd resins, polyesters and polyurethanes which are preformed in the absence of water, then dispersed in water with the use of surfactants to achieve stable small particle size systems.

The polymer particles in the wet paint tend to form a continuous film by coalescing, i.e., by "melting" or fusing together. The coalescing or film forming process is dependent on various factors, including temperature. In paints, typically, the film forming process of the polymer particles occurs above 25° C. Generally, the temperature at which a polymer undergoes film formation is referred to as its minimum film forming temperature (MFFT). For polymer dispersions, MFFT is the minimum temperature where the various forces which preserve the discrete nature of the polymer particles in a latex (and which are therefore considered barriers to coalescence) are exceeded, resulting in the fusion of the particles. Coalescing solvents are utilized to reduce barriers such as viscous and elastic deformation, facilitating film formation. Effectively, coalescing solvents lower the glass transition temperature (Tg) of the polymer, resulting in a reduction of MFFT such that good film formation can be achieved under more favorable conditions.

2,2,4-trimethyl-1,3-pentanediol monoisobutyrate is known in the art as a coalescing solvent for latex polymers. Once the latex is coalesced/formed into a film, the 2,2,4-trimethyl-1,3-pentanediol monoisobutyrate solvent evaporates off, resulting in the return of the polymer to its original Tg. However, the use of this solvent and others containing volatile organic compounds (VOCs) is becoming discouraged due to health and environmental concerns and government regulation. Other known coalescing ester-based solvents may have low VOC characteristics but do not provide the enhanced wet-scrub resistance, block resistance, gloss and/or dirt pick-up resistance properties that are required for latex-based paints today to meet end use demands.

RELATED ART

U.S. Pat. No. 4,148,948 describes dispersible paints that include as a leveling agent a water-insoluble N,N-dimethyl fatty acid amide, the fatty acid of which contains from 6 to 14 carbon atoms. The disclosed paints are suitable for use with water in the roller coating of metal articles, and capable of being cured to a level surface when cured at elevated temperatures (120° C. and higher).

U.S. Pat. Nos. 7,705,081 and 7,705,082 relate to an aqueous latex coating composition and a method for making an aqueous composition that comprises at least one oligomeric ethylene glycol derivative. The oligomeric ethylene glycol derivative functions as both a coalescing solvent and freeze-thaw stabilizer without contributing to the VOC contents of the composition.

U.S. Patent Application Publication 2009/0151601 describes a method to improve an efflorescence resistance of film forming compositions. The method comprises the step of adding a coalescent aid comprising a fatty acid ester to the film forming composition. These non-volatile organic fatty acid ester based coalescents impart superior efflorescence resistance and resistance to color change to film forming compositions, including latex paints, relative to conventional, VOC coalescent solvents, WO 2008/063829A1 relates to a coating composition that includes a latex component and an agent for replacing all or part of the volatile coalescing solvent. The coating composition has a VOC content of less than or equal to 150 g/L.

WO 2009/092795A1 discloses ester amide compounds as solvents, a method for the preparation thereof, and the use of ester amides as solvents, for example in plant-protection formulations.

The entire contents and disclosure of these references are incorporated herein by reference.

Notwithstanding the above literature, there is a continuing need to develop solvents with low VOC characteristics that concomitantly provide superior coalescing/film forming properties such as MFFT, improved block resistance, improved wet scrub resistance, improved gloss development and leveling characteristics when used, for example, in water-based latex paints or floor care products.

SUMMARY OF THE INVENTION

According to one aspect of the invention, a film forming composition is provided which comprises (i) a latex which comprises polymer particles dispersed in a water phase, and (ii) at least one carboxamide selected from the group consisting of:

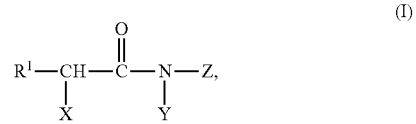

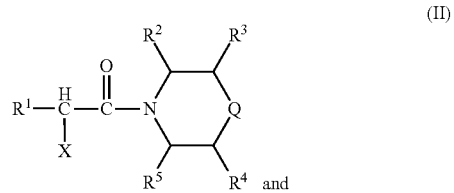

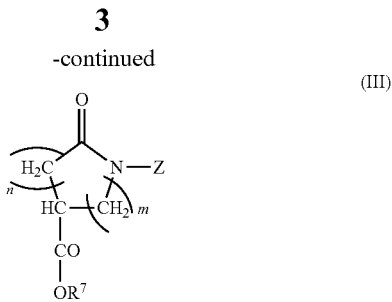

(III)

wherein R¹, X, Y and Z are the same or different and are independently selected from the group consisting of hydrogen and an optionally substituted straight-chain, branched or cyclic, saturated or unsaturated hydrocarbyl group or heterohydrocarbyl group having from 1 to about 25 carbon atoms, with the proviso that at least one of R¹, X, Y and Z is not hydrogen;

R², R³, R⁴ and R⁵ are each independently selected from hydrogen and a hydrocarbyl group of from 1 to 8 carbon atoms;

Q is selected from the group consisting of O, S and N—R⁶;

wherein R⁶ is selected from the group consisting of hydrogen and an optionally substituted straight-chain, branched or cyclic, saturated or unsaturated hydrocarbyl group or heterohydrocarbyl group having from 1 to about 25 carbon atoms;

R⁷ is an optionally substituted straight-chain, branched or cyclic, saturated or unsaturated hydrocarbyl group of from 1 to 12 carbon atoms;

n and m are the same or different and are zero, 1, 2, 3 or 4; and m+n is from 2 to 4.

According to another aspect of the invention, a method is provided for forming a film, comprising applying a film forming composition to a substrate at ambient temperature, wherein the film forming composition comprises (i) a latex comprising polymer particles dispersed in a water phase; and (ii) at least one carboxamide selected from the group consisting of (I), (II), and (III) as described above.

According to a third aspect of the invention, a method is provided for improving wet-scrub resistance, block resistance, gloss development, dirt pick-up resistance and leveling characteristics of a film formed from a latex comprising applying to a substrate at ambient temperature a film forming composition, wherein the film forming composition comprises (i) a latex comprising polymer particles dispersed in a water phase; and (ii) at least one carboxamide selected from the group consisting of (I), (II), and (III) as described above.

According to a fourth aspect, the invention provides a paint comprising a film forming composition which comprises (i) a latex comprising polymer particles dispersed in a water phase; and (ii) at least one carboxamide selected from the group consisting of (I), (II), and (III) as described above.

According to a fifth aspect, the invention provides a floor care formulation comprising a film forming composition which comprises (i) a latex comprising polymer particles dispersed in a water phase; and (ii) at least one carboxamide selected from the group consisting of (I), (II), and (III) as described above.

According to a sixth aspect, the invention provides a caulk product which comprises a film forming composition comprising (i) a latex comprising polymer particles dispersed in a water phase; and (ii) at least one carboxamide selected from the group consisting of (I), (II), and (III) as described above.

According to a seventh aspect of the invention, a method is provided for making a film, comprising applying a film forming composition to a substrate at ambient temperature, wherein the film forming composition comprises (i) an alkyd resin, (ii) at least one polyunsaturated reactive carboxamide; and further comprising providing at least one oxidative catalyst whereby a reaction product of the alkyd resin and the at least one polyunsaturated reactive carboxamide is formed.

According to an eighth aspect, the invention provides a reaction product of alkyd resins and at least one polyunsaturated reactive carboxamide which is made in accordance with the method of the seventh aspect.

According to a ninth aspect of the invention, a film forming composition is provided, comprising a reaction product of alkyd resins reacted with at least one polyunsaturated reactive carboxamide.

According to a tenth aspect, the invention provides a liquid adhesive formulation comprising a film forming composition which comprises (i) a latex comprising polymer particles dispersed in a water phase; and (ii) at least one carboxamide selected from the group consisting of (I), (II), and (III) as described above.

DETAILED DESCRIPTION

Figure 1:
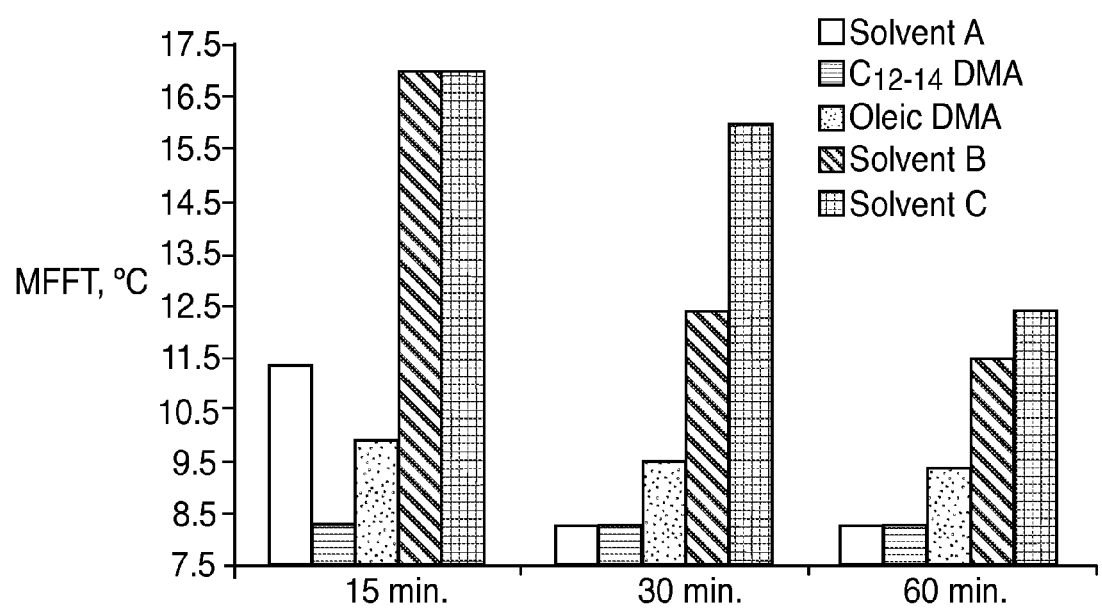
FIG. 1 shows the effect of five different coalescing solvents on MFFT (shown as ° C. on the vertical axis) of an aqueous styrene-acrylic latex composition; at three different time intervals, as described in Example 17 herein. The results show that two carboxamide coalescing solvents, $C_{12-14}$ DMA and Oleic DMA, partitioned more quickly than three comparative coalescing solvents.

The present invention generally relates to film forming compositions containing at least one carboxamide or polyunsaturated reactive carboxamide which may act as coalescing solvents.

In various embodiments, the carboxamides of the invention may have the structure of formula:

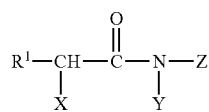
(I)

wherein $R^1$, X, Y and Z are the same or different and are independently selected from the group consisting of hydrogen and an optionally substituted straight-chain, branched or cyclic, saturated or unsaturated hydrocarbyl group or heterohydrocarbyl group having from 1 to about 25 carbon atoms, with the proviso that at least one of $R^1$, X, Y and Z is not hydrogen.

In other embodiments, the carboxamides of the invention may have the structure of formula:

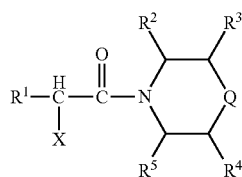
(II)

wherein $R^1$ and X are defined as above, $R^2$, $R^3$, $R^4$ and $R^5$ are each independently selected from hydrogen and a hydrocarbyl group of from 1 to 8 carbon atoms; 0 is selected from the group consisting of O, S and N—$R^6$; and wherein $R^6$ is selected from the group consisting of hydrogen and an optionally substituted straight-chain, branched or cyclic, saturated or unsaturated hydrocarbyl group or heterohydrocarbyl group having from 1 to about 25 carbon atoms.

In other embodiments, the carboxamides of the invention may have the structure of formula:

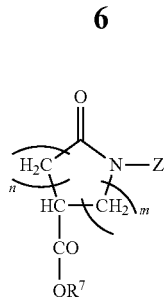
(III)

wherein Z is defined as above, $R^7$ is an optionally substituted straight-chain, branched or cyclic, saturated or unsaturated hydrocarbyl group of from 1 to 12 carbon atoms:

n and m are the same or different and are zero, 1, 2, 3 or 4, and m+n is from 2 to 4.

In optional embodiments of formulas (I) and/or (III), Y or Z comprises from 1 to 8 carbon atoms, e.g., allyl, methyl, ethyl, hydroxyethyl, propyl, butyl, pentyl, hexyl, cyclohexyl, heptyl, 2-ethylhexyl, octyl, isomers of the foregoing, and the like. For example, Y may be hydrogen, methyl or ethyl, and Z may be methyl, ethyl or ethylhexyl.

In optional embodiments of formulas (I) and/or (II), $R^1$ and X comprises from 1 to 18 carbon atoms, e.g., methyl, ethyl, propyl, butyl, pentyl, hexyl, heptyl, octyl, decyl, dodecyl, tridecyl, hexadecyl, octadecyl or isomers of the foregoing.

In particular embodiments of (I) and/or (II), X is hydrogen and $R^1$ is a saturated or unsaturated hydrocarbyl hydrocarbyl radical having from 2 to 18 carbon atoms, preferably a mono-, di- or tri-unsaturated hydrocarbyl radical having from 6 to 18 carbon atoms, more preferably a mono-, di- or tri-unsaturated hydrocarbyl radical having 16 carbon atoms, and isomers of the foregoing. In various embodiments, X is hydrogen and $R^1$ is a mono-unsaturated hydroxy-substituted hydrocarbyl radical having 16 carbon atoms, and isomers of the foregoing.

In certain embodiments of (I) and/or (III), Z is oleoyl, linoleoyl, linolenoyl, or combinations of any two or more thereof.

Specific examples of the carboxamides of the invention include N,N-dimethyl isostearoylamide (isostearic DMA); N,N-dimethyl dodecanoyl amide; N,N-dimethyl $C_{12-14}$ alkanoylamide ($C_{12-14}$ DMA); N,N-dimethyl oleoylamide (oleic DMA); N,N-diethyl $C_{12-14}$ alkanoylamide ($C_{12-14}$ DEA); N,N-dimethyl amides made from soybean oil, soybean oil-derived fatty acid or soybean oil-derived fatty acid methyl ester (Soya DMA); N,N-dimethyl amide made from linseed oil, linseed oil-derived fatty acid or linseed oil-derived fatty acid methyl ester; N,N dimethyl amide made from safflower oil, safflower oil-derived fatty acid or safflower oil-derived fatty acid methyl ester; N,N dimethyl amide made from dehydrated ricinoleic acid glycerol ester, dehydrated ricinoleic acid or dehydrated ricinoleic acid methyl ester; N,N dimethyl amides made from palm kernel, corn, castor, tallow, coconut, tall and tung oils, adds, methyl esters, and the like or combinations of any two or more thereof.

Other examples of the carboxamides of the invention include N,N-dimethyl oleoylamide; N,N-dimethyl linoleoylamide; N,N-dimethyl linolenoylamide; N,N-dimethyl palmitoylamide; N,N-dimethyl stearoylamide; N,N-dimethyl-9,11-octadecadienoylamide; and the like, isomers of the foregoing, or any combinations of two or more thereof.

Additional examples of the carboxamides include N-monoalkyl carboxamides, particularly N-(2-ethylhexyl) $C_{10}$ alkanoylamide ($C_{10}$ MEHA); N-(2-ethylhexyl) 2-ethylhexyl alkanoylamide (EHEHA); N-(2-ethylhexyl) $C_6$ alkanoylamide; or combinations of any two or more thereof.

Still further examples of the carboxamides include 1-(4-morpholinyl)-1-dodecanone ($C_{12}$ morphoamide); 1-(4-morpholinyl)-1-decanone ($C_{10}$ morphoamide); 1-(4-morpholinyl)-1-tetracosanone ($C_{24}$ morphoamide); 1-(4-morpholinyl)-2,4-dimethyl-1-octadecanone; hydroxyethyl piperazinyl dodecanone; 1,4-piperazinyl bis(2-ethylhexyl-1-hexanone); 1-piperazinyl-oleyl amide or mixtures of any two or more thereof.

Additional examples of the carboxamides include 1-(2-ethylhexyl)-5-oxo-3-pyrrolidinecarboxylic acid methyl ester; 1-(2-ethylhexyl)-5-oxo-3-pyrrolidinecarboxylic acid 2-ethylhexyl ester; 1-(allyl)-5-oxo-3-pyrrolidinecarboxylic acid 2-ethylhexyl ester; 1-(2-ethylhexyl)-5-oxo-3-pyrrolidinecarboxylic acid allyl ester; 5-oxo-1-[2-(2-oxo-1-imidazolidinyl)ethyl]-3-pyrrolidinecarboxylic acid methyl ester; 1-(2-ethylhexyl)-5-oxo-3-pyrrolidinecarboxylic acid hexyl ester; N,N'-ethanediyl-bis(5-oxo-3-pyrrolidinecarboxylic acid methyl ester); 1-(2-ethylhexyl)-5-oxo-3-pyrrolidinecarboxylic acid cyclohexyl ester; 1-(cyclohexyl)-5-oxo-3-pyrrolidinecarboxylic acid (2-ethylhexyl) ester; 1-(oleoyl)-5-oxo-3-pyrrolidinecarboxylic acid methyl ester; 1-(2-ethylhexyl)-5-oxo-3-pyrrolidinecarboxylic acid butyl ester; 1-hydroxyethyl-5-oxo-3-pyrrolidinecarboxylic acid (2-ethylhexyl) ester, and the like, or combinations of any two or more thereof.

In specific embodiments, the film forming compositions of the invention comprise reaction products of alkyd resins reacted with at least one polyunsaturated reactive carboxamide, wherein film formation is facilitated through the process of oxidative curing. "Curing" and "oxidative" as used herein are terms well understood in the art. Without wishing to be bound by any specific theory, during oxidative curing the double bonds in polyunsaturated reactive carboxamides react with the double bonds present in the polymer backbone of alkyd resins, e.g., by radical addition, whereby the reaction products of alkyd resins and polyunsaturated reactive carboxamides are formed. Oxidative curing of film forming compositions containing alkyd resins and at least one polyunsaturated reactive carboxamides may occur in the presence of oxidative catalysts under ambient conditions for a predetermined amount of time.

Suitable oxidative catalysts include metal naphthenates or octanoates. Exemplary metal naphthenates are calcium, cobalt, manganese, iron, zirconium, cerium naphthenate or combinations of any two or more thereof. Examples of metal octanoates are calcium, cobalt, manganese, iron, zirconium, cerium octanoates, isomers of the foregoing or combinations of any two or more thereof.

Suitable examples of polyunsaturated reactive carboxamides include N,N di-($C_1$ to $C_4$) alkyl amides of polyunsaturated $C_{12}$ to $C_{22}$ laity acids, including N,N-dimethyl amide made from dehydrated ricinoleic acid, N,N-dimethyl linoleic acid amide, N,N-dimethyl linolenic acid amide, N,N-dimethyl-9,11-octadecadienoic acid amide, or combinations of any two or more thereof.

The latex may comprise one or more polymers and/or copolymers derived from alkyl acrylates, for example methyl acrylates, ethyl acrylates, butyl acrylates and/or 2-ethylhexyl acrylates; alkyl methacrylates, vinyl acetates, styrene, styrene-butadiene, acrylonitrile, vinyl acrylics, vinylacetate-ethylene, vinyl chlorides, styrene-acrylics, siliconized styrene acrylics, butylene, isoprene, ethylene, and the like. However, the invention is not limited in this regard and in yet other embodiments, the latex may be derived from other monomers or combinations of monomers.

In specific embodiments, the film forming compositions are applied to substrates under ambient conditions, e.g., at ambient temperature. Optionally, the film forming compositions disclosed herein are applied to substrates at temperatures below 120° C., optionally below 80° C., particularly below 60° C., more particularly below 40° C. Optionally, the film forming compositions may be dried for a predetermined amount of time, e.g., from 1 hour to 2 weeks, particularly for 1 hour, 2 hours, 1 day, 2 days, 1 week or 2 weeks.

In various embodiments, the minimum film forming temperature (MFFT) of the film forming composition is less than 120° C., optionally less than 100° C., less than 80° C., less than 60° C., or less than 40° C. In particular embodiments, the MFFT of the film forming composition is less than 20° C., less than 15° C., less than 10° C. or less than 5° C.

In an optional embodiment, a film forming composition of the invention may comprise water-based latex paints which comprise a latex or latex binder, one or more carboxamides, and one or more natural or synthetic pigments or natural or synthetic dyes or combinations thereof, for example titanium dioxide, zinc oxide, calcium carbonate, aluminum oxide, aluminum silicate, silica, clay and the like, The film forming compositions may comprise the carboxamides from about 0.1 to about 10 parts by weight based on 100 parts of latex, preferably from about 0.5 to about 10 parts by weight, more preferably from about 2 to about 7 parts by weight. Based on 100 parts of binder, there may be about 5 parts or less of the carboxamides, based on weight. Based on 100 parts of polymer dispersed in the latex, there may be from about 3 to about 7 parts of the carboxamides.

In certain embodiments, the film forming compositions comprise the polyunsaturated reactive carboxamides from about 0.5 to about 10 parts by weight, based on 100 parts of alkyd resin, preferably from about 0.5 to about 8 parts, more preferably from about 2 to about 6 parts.

The film forming compositions as described herein may optionally also contain any one or more of various additional components, such as defoamers, e.g., Foamaster™ VL, available from Cognis, Silfoam™ SE-21, available from Wacker Chemie AG; dispersants, e.g., Tamol™ 165A, available from Dow Chemical; surfactants, e.g., Polystep™ F-4 available from Stepan Company; thickeners, e.g., Acrysol™ RM 8W, available from Dow Chemical; biocides, e.g., Acticide™ GA, available from THOR GmbH, Kathon™, available from Dow Chemicals; co-solvents, e.g., propylene or ethylene glycol, base, e.g., $NH_4OH$, corrosion inhibitors, e.g., Alcophor® 827, available from Cognis; wetting agents, e.g. Zonyl™ FSJ from DuPont; resins, e.g., Resinall™ 802, available from Resinall; metal crosslinkers, e.g., zinc ammonium carbonate available from Mineral Research and Development; and waxes, e.g., Michem™ ME-93235 from Michelman, In water-based latex paints, the carboxamides may be present in an amount sufficient to provide improved block resistance, improved wet scrub resistance, improved gloss development and/or improved dirt pick-up resistance.

In another embodiment, the carboxamides of the invention can be used as plasticizers in latex based caulk products and plastics such as polyvinyl chloride. Also included is their use in liquid adhesive formulations and floor care products where they can facilitate film formation. In floor care products and formulations, the carboxamides may be present in an amount sufficient to improve gloss development and leveling characteristics, and to reduce total VOC content.

The film forming compositions are typically applied to substrates by means of an applicator. Examples of substrates include architectural products such as walls, windows or floors. Examples of applicators include paint brushes or rollers, paint spray devices, floor squeegees, mops, sponges, cloths, and the like.

One skilled in the art will recognize that modifications may be made in the present invention without deviating from the spirit or scope of the invention. The invention is illustrated further by the following examples which are not to be construed as limiting the invention or scope of the specific procedures described herein.

EXAMPLES

Materials 2,2,4-Trimethyl-1,3-pentanediol monoisobutyrate (comparative coalescing solvent, designated Solvent A hereinbelow) was supplied as Texanol™ by Eastman Chemical.

Triethylene glycol bis(2-eihylhexanoate) (comparative coalescing solvent, designated Solvent B hereinbelow) was obtained as Solusolv™ 2075 from Solutia.

Propylene glycol mono oleate (comparative coalescing solvent, designated Solvent C hereinbelow) was supplied as LOXANOL® EFC 100 by Cognis.

Diethylene glycol monoethyl ether (comparative coalescing solvent, designated Solvent D hereinbelow) was obtained from Aldrich.

Dipropylene glycol n-propyl ether (comparative coalescing solvent, designated Solvent E hereinbelow) was obtained from Aldrich Kathon™ CG/ICP (1.5%) biocide and Duraplus™ MP (38%) styrene-acrylic emulsion were supplied by Dow Chemicals.

Zonyl™ FSJ surfactant was supplied by DuPont.

Isodecyl benzoate solvent/VOC/plasticizer, tributoxy ethyl phosphate plasticizer, itaconic acid, and morpholine were obtained from Sigma-Aldrich.

Michem™ MD-91530 acrylic resin, Michem ME-93235 polyethylene wax emulsion and Michem ME 94340 polypropylene wax emulsion were supplied by Michelman.

C-42 Methyl ester was obtained as STEPOSOL™ C-42 from Stepan Company.

Standard abrasive scrub compound was obtained from Leneta as "ASTM-2486 scrub compound".

Abbreviations and terms used: BHT: butylated hydroxytoluene: SDS: sodium docecyl sulfate; P.V.C.: pigment volume concentration; BOM: based on monomer; DI: de-ionized; MeOH: methanol; Full vacuum: −30" Hg (−762 mm)

Minimum Film Forming Temperature (MFFT) Test Method

MFFT was measured on a Rhopoint 90 instrument. The surface temperature was controlled as stated in the individual examples below. The wet films were dried using a constant flow of desiccated, ambient temperature air across their surface. MFFT was determined by visual inspection by noting the sample temperature when the films transitioned from opaque to clear. Clear film formation indicated the transformation of discrete light scattering particles into clear continuous polymer films. The temperature at the transition was determined by an internal thermocouple and the temperature was displayed digitally on the instrument.

Example 1

Preparation of N-2-ethylhexylamide of 2-ethylhexanoic Acid (EHEHA)

2-Ethylhexanoic acid (Akcros Chemicals, 99%; 500 g; 3.47 Mol) was charged to a 2-liter (L) reaction vessel. To the stirred acid was added 2-ethylhexylamine (Akcros Chemicals, 99%; 1.2 equiv.; 4.16 Mol; 538 g), resulting in a moderate exotherm and a temperature increase to 60-65° C. The mixture was stirred vigorously and the temperature increased until evolution of water began, at approximately 170° C. The evolved water was collected in a Dean-Stark trap and the temperature was increased in increments up to a maximum temperature of 220° C., which was held until the free acid content (determined by titration with KOH) had decreased to approximately 1.7%. The mixture was cooled to 140° C. and vacuum was applied in order to remove excess amine and entrained volatiles. The mixture was held at full vacuum and 140° C. for 30 minutes to ensure complete removal of volatiles (stripping). When stripping was complete, the apparatus was equipped for distillation under reduced pressure and the temperature increased in increments until the product began to distill at 160-165° C. When the distillation pot was nearly empty, the apparatus was backfilled with nitrogen and allowed to cool to room temperature. The amide product (849 g; 95.8% yield) was obtained as a pale yellow, highly viscous liquid at room temperature, and the free acid was determined to be 1.40%. Sample materials were collected from this preparation and designated EHEHA for comparison testing described in the Examples below

Example 2

Preparation of the N,N-Dimethylamide of 9,11-octadecadienoic acid (DHRA)

One quart of 9,11 Acid (Vertellus, Batch #103147; EW 283.3 g/Mol; 684 g; 2.4 Mol) was charged to a 2-liter reaction vessel. The mixture was stirred mechanically and heated to 125° C. During heating, anhydrous dimethylamine (DMAM) was introduced via sub-surface sparging through a stainless steel tube attached to a 1 kg cylinder by flexible tubing. The temperature of the mixture was increased until evolution of water began (i.e., to approximately 150° C.). Once distillation of water began, the temperature was periodically increased in increments in order to maintain a steady rate of distillation. When the material reached 175° C. the DMAM feed rate was reduced and the mixture held at that temperature for 3 hours. Titration of an aliquot of the reaction mixture with KOH indicated 20.4% free acid remaining, and the temperature was increased to 190° C. The reaction was continued at 190° C. with a slow feed of MAIM and the free acid level analyzed periodically as described above. After approximately 12 hours of reaction time, the free acid had decreased to 3.4% and the temperature was then raised to 200° C. After an additional 6 hours at 200° C. the free acid level was 1.2%. The mixture was cooled and the product then treated with 50% NaOH in MeOH to reduce the amount of free acid remaining. The mixture was stirred 15 minutes, and then the temperature was raised in increments up to 150° C. while the pressure was reduced to −30" Hg (−762 mm) to remove entrained volatiles. When vacuum stripping was complete, the product was distilled (−30" Hg; 195-210° C.) and obtained as a pale yellow liquid and the free acid was found to be 0.49%. Sample materials were collected from this preparation and designated DHRA for comparison testing described in the Examples below.

Example 3

Preparation of N,N-dimethyl $C_{12-14}$ alkanoylamide ($C_{12}$-$C_{14}$ DMA)

C-42 Methyl Ester (8108 g; approximate EW 219 g/Mol) was charged to a 12-liter reaction vessel. The ester was warmed to 60° C. and dried/degassed under full vacuum with good agitation for 30 minutes. The vessel was backfilled with nitrogen and 30% NaOMe/MeOH solution was charged via syringe (0.75 wt. %; 60 g). The vessel was again evacuated to approximately −30" Hg and sealed under static vacuum. Anhydrous dimethylamine (DMAM) was charged via sub-surface sparging through a stainless steel tube attached to a 1 kg cylinder via flexible tubing. By the end of the day, 910 g of DMAM had been charged. The remaining vacuum was equalized with nitrogen and the mixture stirred overnight at 60° C. The following day, a partial static vacuum was re-established and DMAM charging resumed as above. When the pressure in the vessel equalized, the vessel was attached to a nitrogen overhead at atmospheric pressure, the temperature raised to 70° C. and DMAM charging continued. At the end of the day, the DMAM feed was discontinued and the mixture stirred overnight at 70° C. H-NMR analysis of the mixture indicated approximately 94% conversion to the desired amide. The following day, a slow feed of DMAM was re-introduced and the reaction continued at 70° C. The reaction was continued as above until H-NMR analysis showed less than 1% methyl ester remaining. When the reaction was deemed complete, the vessel was equipped with a distillation sidearm and the mixture vacuum-stripped to remove MeOH and excess DMAM. When stripping was complete, the NaOMe catalyst was neutralized by adding one equivalent of concentrated HCl via pipette, with vigorous agitation for 15 minutes. Approximately 4 liters of the product was transferred to a 5-liter bottom-draining vessel and 600 mL warm water was added, along with approximately 25 mL of 20% brine solution. After stirring vigorously for 10 minutes, agitation was stopped and the layers allowed to separate. The lower aqueous layer was drained off and the washing procedure repeated twice more. The washed product was returned to the 12-liter reaction vessel and the remaining product washed with water/brine as described above. When all of the product had been washed and returned to the 12-liter vessel, it was healed to 100° C. and vacuum slowly applied during heat-up to remove entrained water and volatiles. When stripping was complete, the product was distilled (−762 mm Hg, 160-170° C.) and distillation was discontinued when the pot contained a small quantity of dark oil. The product was obtained as a clear, low-viscosity liquid. Sample materials were collected from this preparation and designated $C_{12-14}$ DMA for comparison testing described in the Examples below.

Example 4

Preparation of N,N-dimethyl oleoylamide (Oleic DMA)

Oleic acid (Palmac® 750: Acidchem Industries; 7080 g) was charged to a 12-liter reaction vessel equipped with a distillation sidearm. The acid was stirred and heated to 60° C. and the pressure reduced to approximately −30" Hg (−762 mm) and held for 30 minutes. The vessel was then sealed under a static vacuum and the temperature setpoint increased to 135° C. During heat-up, anhydrous dimethylamine (DMAM) was introduced via sub-surface sparging through a stainless steel tube attached to a 1 kg cylinder via flexible tubing. When the pressure in the vessel equalized, it was attached to a nitrogen overhead at atmospheric pressure and the temperature increased to 150° C. Distillation of water began when the mixture reached 150° C. and continued until approximately 330 g of water had been collected and 890 g DMAM had been charged. The DMAM feed was discontinued and the mixture allowed to cool to room temperature overnight. The DMAM feed was then restarted and the mixture reheated to 150° C. When the rate of water distillation slowed, the temperature was increased while maintaining a moderate rate of DMAM addition and after 8 hours, the temperature had been raised to 180° C. After 3 hours at 180° C., analysis of an aliquot of the mixture by KOH titration showed 18.8% free amine remaining. The DMAM feed was discontinued and the mixture cooled to room temperature overnight. The mixture was then reheated to 190° C. and a slow feed of DMAM re-established. The reaction was held under these conditions for approximately 6 hours and then the DMAM feed discontinued and the mixture cooled overnight. At that point, approximately 1500 g DMAM had been introduced and 930 g distillate collected. The free acid content at this point was found to be 6.08%. The reaction was then continued with heating at 190° C. with a slow feed of DMAM. After an additional 6 hours at 190° C. the free acid was 4.5%. The DMAM feed was discontinued and the mixture cooled overnight. Then, the mixture was heated to 195° C. and a slow feed of DMAM re-established. After an additional 10 hours of reaction time under these conditions, the free acid level had been reduced to 2.2%. The temperature was raised to 210° C. with a slow feed of DMAM and after 5 hours the free acid content was 1.74%. The reaction temperature was raised to 220° C. with a slow feed of DMAM and after an additional 8 hours of reaction time, the free acid was found to be 1.03% and the reaction judged to be complete and the DMAM feed discontinued and the mixture cooled overnight. The mixture was heated to 210° C. During heat-up, full vacuum was applied in order to remove excess DMAM and volatiles. When the mixture had reached 210° C., the product began to distill and a 50 mL forerun was collected. The remaining product fraction was collected at 0.7 mm Hg and a pot temperature of 210-215° C. and obtained as a pale yellow fluid with free acid less than 1%. Sample materials were collected from this preparation and designated Oleic DMA for comparison testing described in the Examples below.

Example 5

Preparation of 1-(2-ethylhexyl)-5-oxo-3-pyrrolidinecarboxylic acid 2-ethylhexyl ester Step A. Preparation of bis(2-ethylhexyl) itaconate Itaconic acid (400 g; 3.07 Mol) and 2-ethylhexanol (2.1 equiv. vs. itaconic acid; 6.45 Mol; 840 g) were charged to a 2 L reaction vessel. The heterogeneous slurry was stirred mechanically under a nitrogen atmosphere and BHT (1.5 g) and p-toluenesulfonic acid hydrate (2.5 g) were added. The vessel was equipped with a Dean-Stark sidearm trap/condenser apparatus in order to collect evolved water during the reaction. The mixture was heated and stirred vigorously until water began to distill from the mixture, at approximately 130° C. The temperature was then increased in increments as evolution of water slowed, up to a maximum temperature of 160° C. After 3 hours at 160° C., 68 mL of water had been collected (theoretical amount expected=110.5 mL) and the mixture was cooled to room temperature overnight. The following day, the mixture was reheated to 160° C. and a sub-surface nitrogen sparge was introduced in order to facilitate removal of evolved water. After several hours, the temperature was increased to 165° C. and the reaction continued until the theoretical amount of water had been collected. At this point, the mixture was cooled to 150° C. and entrained water and excess 2-ethylhexanol were removed under reduced pressure (approx. −30" Hg) (−762 mm). The vessel was backfilled with nitrogen and the apparatus set up to distill the product. Full vacuum was applied and the temperature increased in increments until the product began to distill at a pot temperature of 190 to 195° C. A small forerun was collected and discarded, and the product fraction was collected between 195 to 205° C. pot temperature. When distillation ceased, a quantity of clear distillate had been collected and the reaction vessel contained approximately 30 mL of a dark liquid. The apparatus was backfilled with nitrogen and allowed to cool. H-NMR analysis of the product was consistent with the expected structure, and indicated the presence of a small quantity of an unidentified impurity. The mass of the product fraction was 964 g (Molecular Weight of bis(2-ethylhexyl)itaconate=354.56 g/Mol; 88.6% yield of distilled product).

Step B. Reaction of bis(2-ethylhexyl) itaconate with 2-ethylhexylamine

Bis(2-ethylhexyl)itaconate (400 g; 1.13 Mol) was charged to a 1 L reaction vessel and the material stirred mechanically under nitrogen while heating to 45° C. 2-Ethylhexylamine (1.02 equiv.: 1.15 Mol; 148.7 g) was charged to a pressure-equalizing addition funnel and the amine added dropwise to the stirred diester over the course of one hour. During the addition, a moderate exotherm was observed and the mixture was allowed to heat to 70° C. When the addition was complete, the mixture was heated to 75° C. and held for one hour before cooling to room temperature overnight. The following day, the vessel was equipped with a distillation sidearm/condenser and heated to 120 to 125° C. under reduced pressure (–30" Hg) (–762 mm) in order to remove 2-ethylhexanol and excess amine. When stripping was complete, the apparatus was backfilled with nitrogen and cooled to room temperature. The amount of 2-ethylhexanol collected was 141.7 g (1.09 Mol; 96.5% of theoretical recovery). The stripped product was warmed to 50° C. and filtered through a 1" (2.5 cm) plug of silica gel, giving the final product as a light yellow liquid. H-NMR analysis of the product was consistent with the expected product. Sample materials were collected from this preparation and designated 1-(2-ethylhexyl)-5-oxo-3-pyrrolidinecarboxylic acid 2-ethylhexyl ester for comparison testing described in the Examples below.

Example 6

Preparation of N,N-diethyl $C_{12-14}$ alkanoylamide ($C_{12-14}$ DEA)

C-42 Methyl Ester (750 g; approximate EW 219 g/Mol) was charged to a 2-liter reaction vessel. The ester was warmed to 40° C. and dried/degassed under full vacuum with good agitation for 30 minutes. The vessel was backfilled with nitrogen and 12.5 g 30% NaOMe solution in MeOH and 311.8 g, 4.26 Mol of diethyl amine was charged. The reactor was equipped with a reflux condenser and nitrogen inlet to provide nitrogen blanket. The reaction was heated to achieve reflux at ~75° C. The reaction was run over a course of several days. Final conversion to amide determined by H-NMR was 87%. The batch was cooled to 60° C. and then stripped under vacuum to remove MeOH and unreacted diethyl amine. The vacuum was broken with nitrogen and catalyst was quenched with the addition of 14 g 50% sulfuric acid. Stirring continued for one hour followed by pulling full vacuum at 55+ C. to remove moisture. The material was then cooled and filtered through a Buchner funnel to remove insoluble solids. Product was transferred to 2 liter flask and equipped for distillation. Full vacuum was applied and the flask contents were heated to 165 to 185° C. 649 g of product was recovered, H-NMR showed about 1% residual methyl ester. Sample materials were collected from this preparation and designated $C_{12-14}$ DEA for comparison testing described in the Examples below.

Example 7

Preparation of Soya DMA

Soya methyl ester (Stepan Company) (2553 g; approx. 8.7 Mol) was charged to a reaction flask equipped with thermocouple, vacuum/pressure gauge, and distillation sidearm with 6" (15 cm) Vigreux column. The ester was stirred mechanically, warmed to 40° C. and 42.6 g of 30% solution NaOMe in MeOH was added. The temperature was raised to 50° C., followed by pulling 635 mm Hg vacuum and charging anhydrous dimethylamine (DMAM) subsurface, using a stainless steel dip tube, over a period of about 8 hours. H-NMR analysis showed >95% conversion to the amide. Volatiles were then removed under vacuum at 50° C. Then 23.7 g of 50% sulfuric acid was added to quench the catalyst. The material was then transferred to a 5 liter bottom draining flask and washed with 4 times 20% brine solution, discarding the aqueous layers. Washed product was transferred back to reaction flask and stripped out water under vacuum at 60 to 65° C. The cooled product was filtered through a 1 inch (2.54 cm) diameter silica gel bed to remove any salts; about 2.6 kg of light yellow liquid were recovered. Sample materials were collected from this preparation and designated Soya DMA for comparison testing described in the Examples below.

Example 8

Preparation of 1-(2-ethylhexyl)-5-oxo-3-pyrrolidinecarboxylic acid butyl ester

Step A. Preparation of bis(butyl) itaconate

Itaconic acid (500 g; 3.84 Mol) and butanol (2.5 equiv. vs. itaconic acid; 9.6 Mal; 712 g) were charged to a 2 L reaction vessel. The heterogeneous slurry was stirred mechanically under a nitrogen atmosphere and BHT (1.5 g) and p-toluenesulfonic acid hydrate (2.5 g) were added. The vessel was equipped with a Dean-Stark sidearm trap/condenser apparatus in order to collect evolved water during the reaction. The mixture was heated and stirred vigorously until water began to distill from the mixture to 115° C. The temperature was held for ~3 hour, and 65 ml of water was collected, theoretical=137.2 ml. The temperature was increased to 140° C. for an additional ~6 hours, to collect total theoretical water. The mixture was cooled to 90° C. and then vacuum-stripped to remove excess butanol under full vacuum, followed by heating at full vacuum. Product was collected at a head temperature of 130 to 142° C. Distilling then continued until the distillation pot was nearly empty; 906.6 g (3.74 Mol) were collected which corresponds to 97.4% yield. H-NMR analysis confirmed the structure of the expected product.

Step B. Reaction of bis(butyl) itaconate with 2-ethylhexylamine

Bis(butyl) itaconate (400 g; 1.65 Mol) was charged to a 1 L reaction vessel and the material stirred mechanically under nitrogen while heating to 75° C. 2-Ethylhexylamine (1.7 Mol; 219.7 g) was charged to a pressure-equalizing addition funnel and the amine added drop wise to the stirred diester over the course of one hour and stirred at 75° C. for 2 hours after amine addition. The reactor was equipped for distillation and the temperature was increased slowly to 130° C., holding at full vacuum until stripping was complete. Receivers were changed and the pot heated under full vacuum to increase pot temperature to 165 to 185° C. (head temperature 140 to 175° C.). 469.3 g of product 1.58 Mol; 95.6% yield was collected. Sample materials were collected from this preparation and designated 1-(2-ethylhexyl)-5-oxo-3-pyrrolidinecarboxylic acid butyl ester for comparison testing described in the Examples below.

Example 9

Preparation of 1-(2-ethylhexyl)-5-oxo-3-pyrrolidinecarboxylic acid hexyl ester

Step A. Preparation of bis(hexyl) itaconate

Itaconic acid (292.3 g; 3.02 Mol) and hexanol (2.1 equiv. vs. itaconic acid; 6.33 Mol; 647 g) were charged to a 2 L reaction vessel. The heterogeneous slurry was stirred mechanically under a nitrogen atmosphere and BHT (1.5 g) and p-toluenesulfonic acid hydrate (2.5 g) were added. The vessel was equipped with a Dean-Stark sidearm trap/condenser apparatus in order to collect evolved water during the reaction. The mixture was heated and stirred vigorously until water began to distill from the mixture. The temperature was then increased in increments as evolution of water slowed up to a maximum temperature of 180° C. After 3 hours at 180° C. 105 mL water had been collected and the mixture was cooled to room temperature. The mixture was reheated to 180° C. and a sub-surface nitrogen sparge was introduced in order to facilitate removal of evolved water. After 2.5 hours, 110 ml of water had been collected. The mixture was cooled to 150° C. and entrained water and excess hexanol were removed under reduced pressure (approx. −25" Hg) (−635 mm) with a pot temperature of 150° C. After stripping was completed, the pot temperature was raised to 190° C. under full vacuum and the product collected at a head temperature of ~175 to 195° C. until distillation ceased, 827.7 g of product was recovered. H-NMR analysis of the product was consistent with the expected structure. FW bis(hexyl) itaconate=298.4, 2.77 Mol, 91.8% yield.

Step B. Reaction of bis(hexyl)itaconate with 2-ethylhexylamine

Bis(hexyl)itaconate (400 g; 1.34 Mol) was charged to a 1 L reaction vessel and the material stirred mechanically under nitrogen while heating to 45° C. 2-Ethylhexylamine (1.05 equiv.; 1.41 Mol; 182 g) was charged to a pressure-equalizing addition funnel and the amine added dropwise to the stirred diester over the course of one hour. During the addition, a moderate exotherm was observed. When the addition was complete, the mixture was heated to 75° C. and held for one hour before cooling to room temperature overnight. The following day, the vessel was equipped with a distillation sidearm/condenser and heated to 90° C. under reduced pressure (−25" Hg) (−635 mm) in order to remove hexanol and excess amine. When stripping was complete, H-NMR analysis of the product was consistent with the expected lactam structure. 136.6 g was recovered of yellow moderately viscous liquid. Sample materials were collected from this preparation and designated 1-(2-ethylhexyl)-5-oxo-3-pyrrolidinecarboxylic acid hexyl ester for comparison testing described in the Examples below.

Example 10

Preparation of N,N-dimethyl isostearoylamide (Isostearic DMA)

Methyl isostearate (MP Biomedicals) EW 298.5 g/Mol; 234 g, 0.78 Mol) was charged to a 2-liter reaction vessel. The ester was warmed to 50° C. and dried/degassed under full vacuum with good agitation for 30 minutes. The vessel was backfilled with nitrogen and 10 ml of 30% NaOMe/MeOH solution was added, followed by breaking the vacuum with slow sub-feed of anhydrous dimethylamine (DMAM). DMAM was slowly charged via sub-surface sparging through a stainless steel tube attached to a 1 kg DMAM cylinder via flexible tubing. By the end of the day, 39 g of DMAM (0.86 Mol) had been charged, followed by stirring overnight at 60° C. The following day, H-NMR of the crude material indicated high conversion. Vacuum was then applied to remove any remaining volatiles such as DMAM until no volatiles were observed. The vacuum was then broken with nitrogen and then ~6 g 50% sulfuric acid was added to quench catalyst. Stirring continued for 15 minutes and then vacuum was applied to remove water. The mixture was then filtered through a silica gel bed to remove salts. The final product was a yellow liquid, H-NMR indicated desired amide with traces of unreacted methyl ester. Sample materials were collected from this preparation and designated Isostearic DMA for comparison testing described in the Examples below.

Example 11

Preparation of N-(2-ethylhexyl) $C_{10}$ alkanoylamide ($C_{10}$ MEHA)

Methyl decanoate (Pastell M 10 from Lion Corp. 930 g; 4.99 Mol) was charged to a 2-L reaction vessel. The material was heated to 50° C. under full vacuum to remove moisture. After 20 minutes the vacuum was broken with nitrogen and 2-ethylhexylamine (Akcros Chemicals, 99%; 5 Mol; 645 g) was added, followed by adding 15.5 g of 30% NaOMe in MeOH. The mixture was stirred vigorously and the temperature increased slowly to about 150° C. The evolved MeOH was collected in a Dean-Stark trap over a period of 9 hours, 191 ml collected. The mixture was cooled to 90° C. The apparatus was then fitted for distillation and full vacuum was applied in order to remove any volatile components. The mixture was held at full vacuum until volatiles were no longer distilling over, and vacuum was then broken by nitrogen. The catalyst was quenched with the addition of 16.7 g of 6 molar HCl with mixing for 15 minutes. Vacuum was once again applied with heating to about 90° C. to strip out water. The distillation receiver was switched out and the pot temperature slowly increased to 200° C. to collect product. Nearly all the liquid distilled over, the yield was 1284.5 g. H-NMR indicated essentially pure product. Sample materials were collected from this preparation and designated $C_{10}$ MEHA for comparison testing described in the Examples below.

Example 12

Synthesis of 1-(4-morpholinyl)-1-dodecanone ($C_{12}$ Morphoamide)

Morpholine (552.1 g), C-42 methyl ester (1405.3 g), and 35 mL of 30% sodium methoxide solution (0.75 wt. % based on methyl esters) was added to a 4 L reaction kettle as described above. The reaction mixture was heated to 65° C. with stirring for 4 hours. The temperature was increased to 75° C. and allowed to stir for 2 hours. At this point, MeOH was removed with the aid of a recirculating pump for 1.5 hours. A total of 180.9 g of distillate was collected. Once it appeared that no more MeOH was distilling into the trap, the reaction was cooled to room temperature and the viscous, gelatinous mass was transferred to a 5 L round-bottom, separatory funnel equipped with a mechanical stirrer and a bottom take-off valve. DI water (200 mL) was added with stirring, and the mixture was neutralized to pH 6.5 with 50% aqueous sulfuric acid. After brief stirring to ensure complete neutralization, the layers were separated, and the organic layer was washed 200 mL of 20% brine solution. A second wash with 20% brine was performed, and the layers were allowed to separate. The organic layer was washed twice with 200 mL of DI water. The aqueous layers were drained away and organic layer then transferred in batches to a 2 L round bottomed flask and dried further on a rotary evaporator set at 60° C. The product was dried on the evaporator in 2 separate batches. Each was dried for approximately 1 hour at 60° C.

Norit™ SX Ultra (Norit) powdered, activated carbon was added to the clear, reddish-brown liquid and mechanically stirred for 2 hours. The dark carbon suspension was then filtered through a bed of Celite 545 filter aid on a coarse fritted glass funnel. The carbon treated feed was then filtered through a bed of acidic aluminum oxide. A total of 1351.18 g of filtrate was collected. A sample of the filtrate was analyzed by $^1$H NMR, and showed no signs of impurities. Further analysis resulted in: moisture=0.51%, specific gravity=0.945, and Gardner color analysis=3.9, pH (1% w/w in 50:50 IPA/water)=5.38. Brookfield viscosity at 25° C.=28 cps. Sample materials were collected from this preparation and designated $C_{12}$ Morphoamide for comparison testing described in the Examples below Example 13

Latex Coalescence by Minimum Film Forming Temperature (MFFT). Comparison of Tertiary Amides to Control Coalescing Solvents 0.5 grams of coalescing solvents was added to a mixture of 20 grams each of DI water and an acrylic latex prepared at 83° C. by a three hour monomer feed semi-batch free radical polymerization of methyl methacrylate, butyl acrylate and acrylic acid at 68, 30 and 2 parts, respectively, using a conventional free radical initiator and anionic surfactant. The latex had a MFFT of 46° C. and 48 wt. percent of solids. The solvent-latex mixtures were mixed overnight. Solvent A, Isostearic DMA, and $C_{12-14}$ DMA were compared. Wet films of the three blends, each measuring 2.5 cm wide and 75 microns in wet thickness, were cast onto a Rhopoint MFFT 90 instrument as described under Test Methods. The surface temperature gradient was controlled from 0 to 18° C. The results indicated Solvent A, Isostearic DMA, and $C_{12-14}$ DMA solvents were effective in lowering the MFFT of the latex to about 12.5, 14.5 and 12.5° C., respectively.

Example 14

Latex Coalescence by Minimum Film Forming Temperature (MFFT). Comparison of Tertiary Cyclic Amides to Control Coalescing Solvents Twenty grams each of DI water and the acrylic latex used in Example 13 were combined with agitation, and 0.45 grams of $C_{12}$ Morphoamide was added. The resulting mixture was mixed for two hours. The same process was used to make a comparative blend containing 0.45 grams of Solvent A. Wet films of the two blends were cast onto the Rhopoint MFFT 90 whose surface temperature gradient was controlled from 0 to 18° C. and dried as described in Test Methods. The results showed the $C_{12}$ Morphoamide to be an effective coalescing solvent. Both solvents lowered the MFFT to 13.5° C.

Example 15

Latex Coalescence by Minimum Film Forming Temperature (MFFT). Comparison of Secondary Amides to Control Coalescing Solvents Three mixtures each containing 20 grams each of DI water and a styrene-acrylic latex were prepared. The latex was prepared by a semi-batch free radical polymerization of methyl methacrylate, butyl acrylate, styrene and acrylic acid at 34, 20, 44 and 2 parts, respectively, using a conventional free radical initiator and anionic surfactant. The latex had a MFFT of 23° C. and 47 wt. % solids. 0.5 grams of the coalescing solvents Solvent A, $C_{10}$ MEHA and a 50/50 mixture of the two were added to the latex dispersions and mixed overnight. The next day, wet films of the three blends were cast onto the surface of the Rhopoint MFFT 90 whose surface temperature gradient was controlled from 5 to 23° C. and dried as described in Test Methods. The results indicated the solvents lowered the MFFT of the latex from 23° C. to 5.5°, 7° and 4.5°, for Solvent A, $C_{10}$ MEHA and the 50/50 solvent mixture, respectively. Combining Solvent A and a carboxamide solvent resulted in increased efficiency compared to using either alone.

Example 16

Latex Coalescence by Minimum Film Forming Temperature (MFFT). Comparison of Unsaturated Amides to Control Coalescing Solvents Four latex mixtures, each containing 20 grams of DI water and the acrylic latex were prepared. The latex was prepared by a semi-batch free radical polymerization of methyl methacrylate, butyl acrylate and acrylic acid at 54, 44 and 2 parts, by wt., respectively using a conventional free radical initiator and anionic surfactant. The latex had a MFFT of 18° C. and 48 wt. % solids. To the four separate latex dispersions were added 0.5 grams of solvents Solvent A, $C_{12-14}$ DMA, Oleic DMA and Soya DMA. The mixtures were mixed overnight. The next day wet films of the blends were cast onto the Rhopoint MFFT 90 whose surface temperature gradient was controlled from 0 to 18° C. and dried as described in Test Methods. The results showed that all the solvents lowered the MFFT of the latex from the initial 18° C. to about 5° C.

Example 17

Solvent Partitioning Rate by MFFT. Comparison of Tertiary Amides to Control Coalescing Solvents With agitation, to five mixtures containing 20 grams each of DI water and the styrene-acrylic latex prepared according to Example 15 0.5 grams of coalescing solvent was added as follows: Solvent A, $C_{12-14}$ DMA, Oleic DMA, Solvent B, and Solvent C. The mixtures were mixed for specified periods of time. Then wet films of the mixtures were cast onto the Rhopoint MFFT 90 whose surface temperature gradient was controlled from 0 to 18° C. and dried as described in Test Method 1. Coalescing temperatures were measured at 15, 30 and 60 minutes as recorded in FIG. 1. The data showed that the two carboxamide solvents partitioned more quickly than the two comparative low VOC solvents (Solvent B and Solvent C), and comparative Solvent A.

Example 18

Coalescing Solvents in Paint Formulations

A master batch of latex paint was formulated by charging 1136 grams of pre-dispersed titanium dioxide (76.9% solids slurry supplied by DuPont as Ti-Pure® R-746) into a 4 liter beaker. 508 grams of water was added with mixing using a Jiffy mix blade at 900 to 1000 rpm followed by the addition of 48 grams of propylene glycol, 1680 grams of latex, and 48 grams of Acrysol™ SCT-275 non-ionic urethane rheology modifier (Rohm & Haas, 17.5% solids). The latex was the same as described in Example 15 In addition, 1.8 grams of Acticide® GA biocide (Thor GmbH containing 2-Bromo-2-nitropropane-1,3-diol, 2-methyl-4-isothiazolin-3-one and 5-chloro-2-methyl-4-isothiazolin-3-one) was added and the formulation mixed for 20 minutes. The pH was adjusted to between 8.0 and 8.5 with concentrated $NH_4OH$. The master batch was then divided into 315 gram portions each in 400 ml beakers and mixed at between 800 and 850 rpm. Additions of 5.5 grams of various solvents were then added to each portion along with incremental additions of additional Acrysol™ SCT-275 to achieve the target viscosity range, and each sample was mixed for 10 minutes. The formulated paints were stored for 24 hours to allow for viscosity development after which the Stormer viscosities were determined to be in the range of 95 to 98 KU (Krebs units). The solvents evaluated were $C_{12-14}$ DMA, Oleic DMA, $C_{12}$ Morphoamide, $C_{12-14}$ DEA, and Solvent B.

Figure 2:
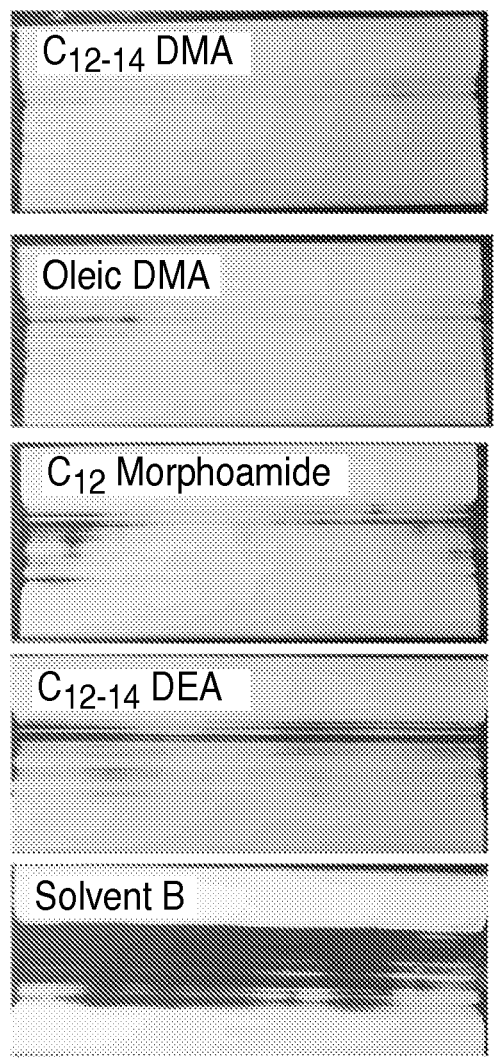
FIG. 2 shows photographs of latex paints on panels subjected to wet scrub tests, the films having been formed using five different coalescing solvents as described in Example 18 herein. The results show that four carboxamide coalescing solvents, $C_{12-14}$ DMA, Oleic DMA, $C_{12}$ Morphoamide, and $C_{12-14}$ DEA, were less susceptible to wet-scrubbing than a comparative coalescing solvent.

Wet scrub resistance based on a modified version of ASTM-2486-00. method B; modified to percent weight loss, was performed for each of the paint formulations. The paints were applied to Leneta P-121-10N plastic panels using a 13 cm wide 7 mil (0.17 mm) wet film applicator and dried under ambient conditions for two weeks prior to testing. The coated panels were then cut into test strips measuring 16.5 cm×5.7 cm (2 per drawdown). Two test strips at a time were placed on a Gardner Company scrub tester with approximately a 2" (5 cm) gap between them and were taped to secure panels to the machine. A spacer was placed over the test strips to maintain the scrub brush pathway and further secure the test specimen. An 8 cm×3 cm scrub brush, preconditioned in room temperature water, was inserted into the holder. 10 grams standard abrasive scrub compound was applied evenly to the brush. 5 grams of water was placed into the gap between the tested samples. Test strips were tested to 1200 cycles. Ten grams of the scrub compound and 5 grams of additional water were reapplied every 400 cycles. These panels were then photographed; the resultant photographs are reproduced in FIG. 2. FIG. 2 showed that all four of the carboxamide solvents outperformed comparative low VOC Solvent B, as can be seen by the complete removal of the paint coating from the Solvent B-containing dried paint film.

Example 19

Coalescing Solvents in Paint Formulations

A master batch of latex paint was formulated by charging 672 grams of pre-dispersed titanium dioxide (76.9% solids slurry supplied by DuPont as Ti-Pure® R-746) into a 2 liter beaker. 303 grams of DI water was added with mixing followed by 27.8 grams of propylene glycol and 995 grams of Rhoplex™ SG-20 acrylic latex supplied by Rohm & Haas at 46% solids. 2.2 grams of Acticide® GA preservative was added and mixed for 20 minutes. The pH of the paint blend was adjusted to 8.3 with 1:4 diluted concentrated $NH_4OH$. The calculated P.V.C. was 23%. The paint's solids were determined to be 49.1 weight %. The master paint batch was then divided into five 315 gram portions into 400 ml beakers which were mixed between 800 and 850 rpm. 5.5 grams of the following solvents were then added to each portion, respectively: Solvent A, Solvent B, Solvent C, $C_{12-14}$ DMA, and Oleic DMA. Between 0.49 and 0.71% Acrysol® SCT-275 was also added to each paint formulation to achieve the target KU viscosity range. The formulated paints were mixed for 10 minutes and stored for 24 hours to allow for viscosity development after which the Stormer viscosities were determined to be between 96.5 and 100.5 KU.

Wet Scrub Resistance was measured based on a modified version of ASTM-2486-00, method B; modified to % weight loss, as follows: The formulated paints were applied to Leneta P-121-10N plastic scrub panels using a 13 cm wide 7 mil (0.17 mm) wet film applicator. The coatings were then dried for 7 days at ambient conditions after which strips measuring 16.5 cm×5.7 cm were cut from each panel (2 per drawdown). All samples were weighed before and again after the test. Two samples at a time were placed on the scrub tester with approximately a 2" (5 cm) gap between the samples, and taped to secure panels to the machine. A spacer was placed over the samples to maintain the scrub brush pathway and further secure the samples. The scrub brush, preconditioned in room temperature water, was inserted into the holder. 10 grams of standard abrasive scrub compound was applied evenly to the brush. 5 Grams of water was placed into the gap between the samples. Samples were tested to 500 cycles. 10 grams of the scrub compound and 5 grams of additional water were reapplied after 250 cycles. The scrubbed samples were rinsed in tepid water, dried approximately 24 hours, and then weighed. The difference in weight before and after scrubbing, resulting from the scrubbing procedure, was then calculated.

Figure 3:
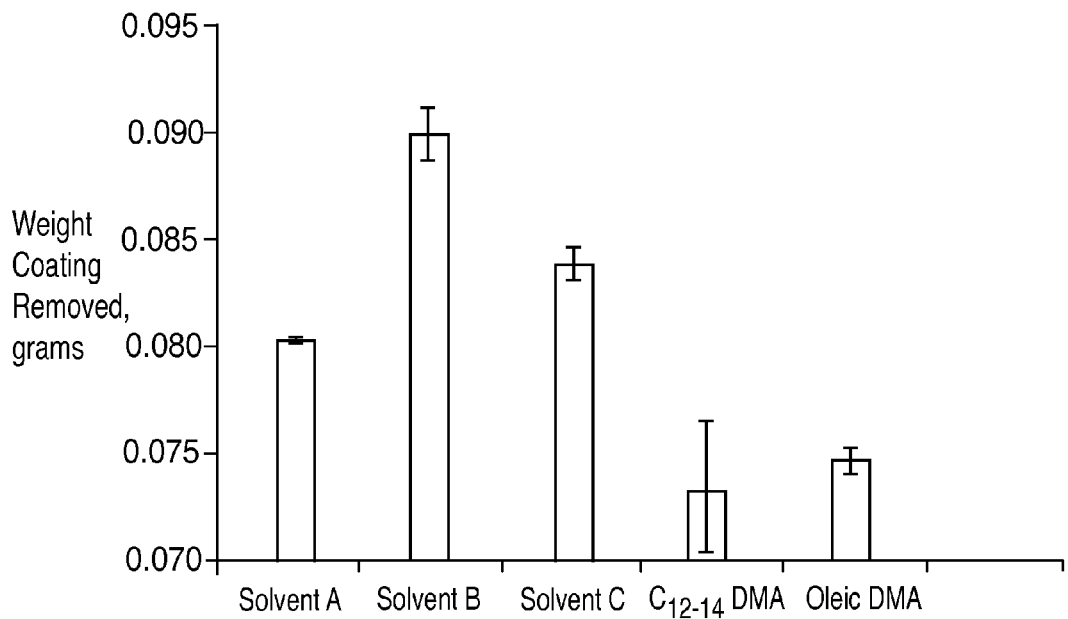
FIG. 3 presents scrub resistance test results for paint samples made from five different coalescing solvents, as described in Example 19 herein. The results show that two carboxamide coalescing solvents, $C_{12-14}$ DMA and Oleic DMA, gave improved resistance to paint coating removal during exposure to scrubbing relative to three comparative coalescing solvents.

Percent coating removed was then determined. The results are presented in FIG. 3. Lower values indicate better scrub resistance. The data in FIG. 3 show the DMA solvents performed better than comparative Solvent A, Solvent B and Solvent C.

Figure 4:
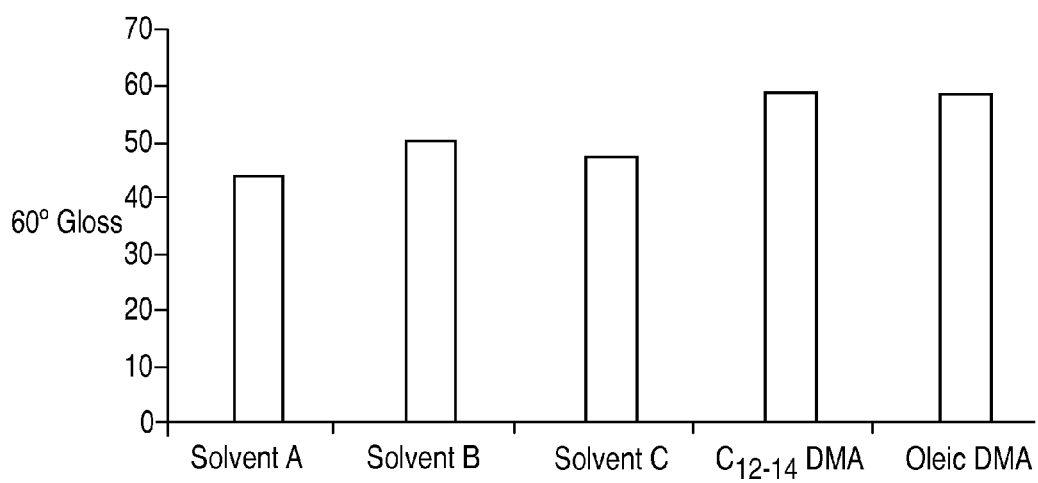
FIG. 4 shows a comparison of gloss values for paint samples prepared from five different coalescing solvents as described in Example 19 herein. The results show that two carboxamide coalescing solvents, $C_{12-14}$ DMA and Oleic DMA, gave improved gloss values relative to three comparative coalescing solvents.

Gloss: 60 degree gloss values were determined for each of the coatings that had been coated onto the Leneta P-121-10N plastic panels prior to running the scrub test. FIG. 4 shows the superior gloss development of the DMA solvents as compared to comparative Solvent A and the two comparative low VOC solvents.

Figure 5:
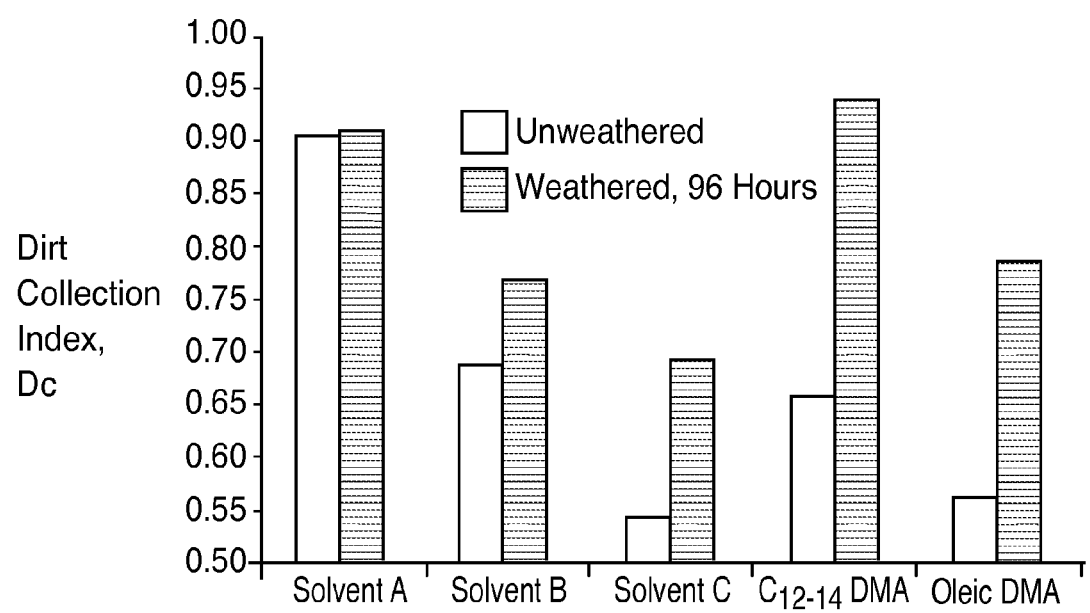
FIG. 5 shows a comparison of Dirt Collection Index values for paint samples made from five different coalescing solvents, including two carboxamide coalescing solvents, $C_{12-14}$ DMA and Oleic DMA, as described in Example 19 herein.

Dirt pick-up resistance evaluations were conducted using a modified version of ASTM D3719 ("Quantifying Dirt Collection on Coated Exterior Panels") and ASTM D6695 (Xenon-Arc Exposure of Paints; Standard Practices for Architectural Coatings. Q-panel aluminum panels were coated with the paints using a wire wound, #70 (7 mils) (0.17 mm) applicator rod. The panels were dried at room temperature for 7 days. The dirt-pick up test was performed using panels aged under ambient conditions and panels aged using a Q-Sun Xenon Weathering tester (96 hours weathering). The Q-Sun Xenon weathering tester was set-up with the following parameters: Back panel-630, Chamber-48C, Humidity-50%, 96 hrs. (85% 340 nm exposure light, 15% exposure light/spray). A handheld spectrophotometer was used to measure the initial L value (lightness) of the coating. A uniform iron oxide coating slurry was prepared by combining 125 grams of water and 2 drops of Tamol™ dispersant (Rohm & Haas) with mixing, followed by the addition of 125 grams of powdered iron oxide. The dispersed iron oxide slurry was brushed onto the surface of the panels. The panels were then air dried for 2 hours, placed in a 49° C. oven for 1 hour, followed by cooling to ambient temperature for 15 minutes. The samples were then placed under running tepid water, rubbing the surface lightly in a circular motion with cheesecloth, removing most of the iron oxide. The panels were then dried at ambient temperature for 24 hours. The lightness after iron oxide treatment, L* final, was then measured. The dirt collection index for the panels was then calculated using the following equation: L* final/L initial=Dc. The results are presented in FIG. 5 which shows that carboxamide solvents outperformed comparative low VOC solvents.

Example 20

Wet-Scrub Resistance on Alkyd Paint

A master batch of paint was prepared in a similar manner as described in Example 19. 767 grams Ti-Pure® R-746 slurry (DuPont), 190 grams water, 30 grams propylene glycol, 630 grams of the acrylic latex described in Example 16 and 1 gram Acticide® GA were combined. The master batch was then divided into four 212 gram portions of sample paint. 3.7 grams of one of the following solvents was then added with mixing to each portion, respectively: Solvent A, $C_{12-14}$ DMA, Oleic DMA, and Solvent B. The viscosities of the resulting sample paints were adjusted to between 94 and 98 KU's with between 2.94 and 3.04 grams Acrysol® SCT-275. The final properties of the sample paints were 49% solids, pH 8.5 and calculated P.V.C.=23%.

Figure 6:
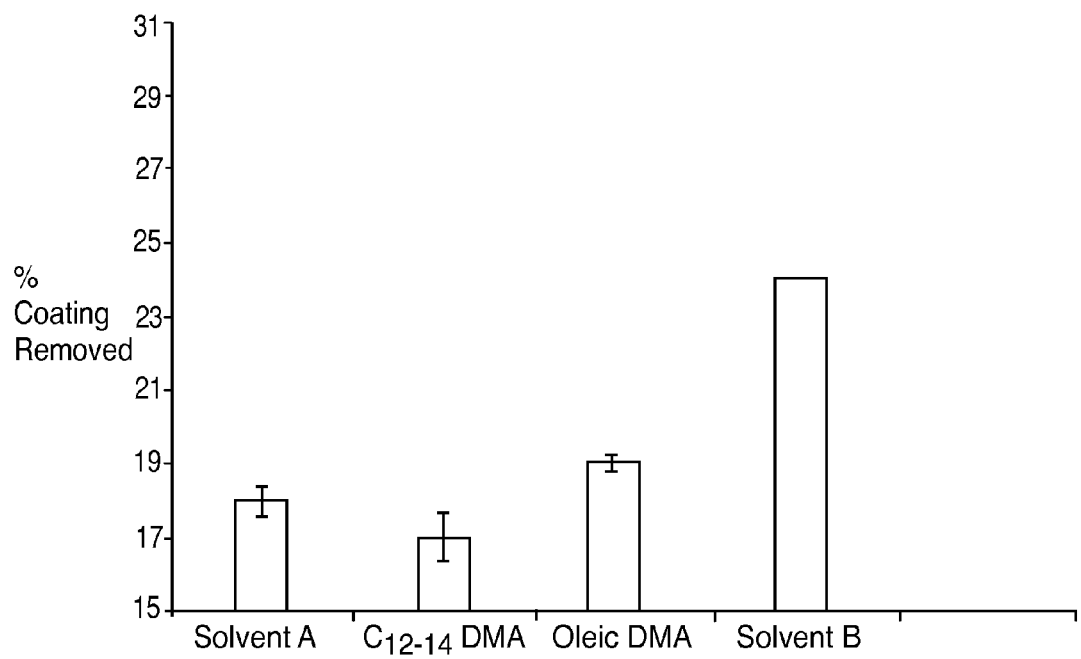
FIG. 6 is a bar chart comparing scrub resistance test results for acrylic latex paint samples made with four different coalescing solvents, as described in Example 20 herein. The results show that two carboxamide coalescing solvents, $C_{12-14}$ DMA and Oleic DMA, gave improved resistance to paint coating removal during exposure to scrubbing compared to two comparative coalescing solvents.

The final formulated sample paints were applied to aged alkyd panels using a 13 cm wide, 7 mil (0.17 mm) wet film applicator. The alkyd panels were prepared by coating tinted Glidden Ultra-Hide® Alkyd Gloss Enamel onto black Leneta plastic scrub panels and cured for four days at 50° C. Each paint sample was coated in triplicate onto separate alkyd panels which were then dried for seven days. The dried coatings were then cut into strips measuring 16.5 cm×5.7 cm (cut from each panel, 2 per drawdown). Two sample panels at a time were placed on the scrub tester with approximately a 2" (5 cm) gap between the samples, and taped to secure panels to the machine. A spacer was placed over the samples to maintain the scrub brush pathway and further secure the samples. An 8 cm×3 cm scrub brush, preconditioned in room temperature water, was inserted into the holder. 10 grams of standard abrasive scrub compound was applied evenly to the brush. 5 grams of water was placed into the gap between the samples. Samples were tested to 150 cycles. Digital images were produced of the scrubbed panels. Image analysis was then performed using Scion Imaging Software to quantitatively measure the amount of coating removed. The scrub tests were performed in triplicate and an average of the three measurements was recorded. The results are summarized in FIG. 6 which shows the carboxamide solvents have superior scrub resistance compared to the two comparative low VOC solvents.

Example 21

Dirt Pick-up Resistance

Four formulated paints prepared in Example 20, containing $C_{12-14}$ DMA, Oleic DMA, Solvent A, and Solvent B coalescing solvents, were evaluated for dirt pick-up resistance using a modified version of ASTM D3719 and ASTM D6695 referenced in Example 19. Q-panel aluminum panels were coated with the paints using a wire wound, #70 (7 mils) (0.17 mm) applicator rod. The panels were dried at room temperature for 7 days. The dirt-pick up test was performed using panels aged under ambient conditions and panels aged using a Q-Sun Xenon Weathering tester (96 hrs. weathering).

Figure 7:
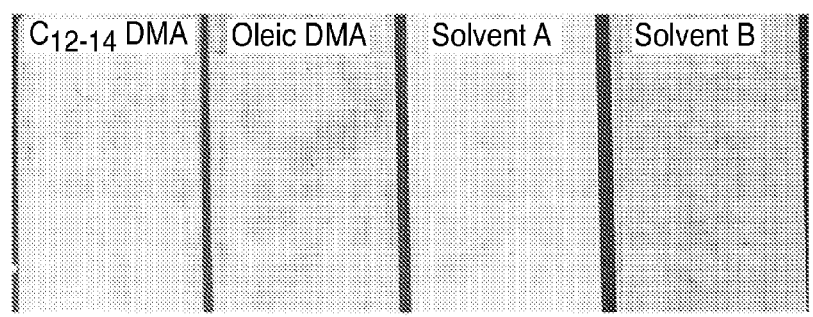
FIG. 7 shows photographs of latex paint panels bearing a latex film, the films having been formed using four different coalescing solvents and then being subjected to dirt pick-up testing as described in Example 21 herein. The results show that two carboxamide coalescing solvents, $C_{12-14}$ DMA and Oleic DMA, gave improved resistance to dirt pick-up compared to a comparative low VOC coalescing solvent.

Weathering: A Q-Sun Xenon weathering tester was set-up with the following parameters: Black panel-63C, Chamber-48C, Humidity-50%, 96 hrs. (85% 340 nm exposure light, 15% exposure light/spray). After exposure a uniform iron oxide coating slurry was prepared by combining 125 grams of water and 2 drops of Tamol™ dispersant (Rohm & Haas) with mixing, followed by the addition of 125 grams of powdered iron oxide. The dispersed iron oxide slurry was brushed onto the surface of the panels. The panels were then air dried for 2 hours, placed in an oven 49° C. for 1 hr., followed by cooling at RT for 15 minutes. The samples were then placed under running tepid water, rubbing the surface lightly in a circular motion with cheesecloth, removing most of the iron oxide. The panels were then dried at ambient for 24 hours. Photographs of the panels were e taken as shown in FIG. 7. Visual inspection of the test panels showed that the panels made with paints using the carboxamide solvents generally outperformed comparative low VOC solvents such as Solvent B.

Example 22

Coalescing Solvents in Paint Formulations

A master batch of latex paint was formulated by charging 682 grams of pre-dispersed titanium dioxide (76.9% solids slurry supplied by DuPont as Ti-Pure® R-746) into a clean 2000 ml beaker. 307 grams of water was added with mixing. 1009 grams of Rhoplex™ SG-20 latex (supplied by Rohm & Haas) at 46% solids was added, followed by 2.2 grams of Acticide GA preservative, Mixing was continued for 20 minutes. The pH of the paint blends was adjusted to pH 8.2 with concentrated $NH_4OH$. The calculated P.V.C. was 23%. The paint's solids were determined to be 49.1 weight %. The master paint batch was then divided into five 315 gram portions each into 400 ml beakers which were then mixed at between 800 and 850 rpm. 2.8 grams of various solvents were then added to each portion, respectively: $C_{12-14}$ DMA, Oleic DMA, Soya DMA, Solvent B, and Solvent A. Between 0.44 and 0.48% Acrysol SCT-275 was added to each paint formulation to achieve the target KU viscosity range. The resulting paints were mixed for 10 minutes and stored for 24 hours to allow for viscosity development, after which the Stormer viscosities were determined to be about 100 KU.

Figure 8:
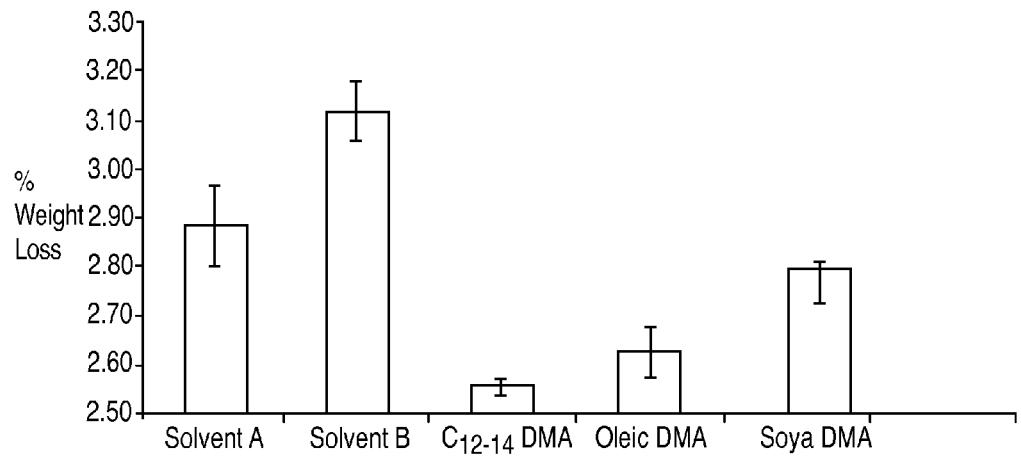
FIG. 8 is a bar chart comparing wet scrub resistance test results for paint samples made from five different coalescing solvents, as described in Example 22 herein. The result showed that three carboxamide coalescing solvents, $C_{12-14}$ DMA, Oleic DMA, and Soya DMA, showed less percent weight loss than two comparative coalescing solvents.

Wet scrub resistance evaluations based on a modified version of ASTM-2486-00 were performed for each of the paint coatings as described in Example 19. The formulated products were applied to Leneta P-121-10N plastic panels using a 13 cm wide, 10 mil (0.25 wet film applicator, and dried under ambient conditions for about 3 months prior to testing. The samples were tested for 650 scrub cycles. 10 grams of standard abrasive scrub compound and 5 grams of water were reapplied after 300 cycles. The scrubbed samples were then rinsed in tepid water, dried for approximately 24 hours, and then weighed. The percent coating removed was determined as described in Example 19. The results are displayed in FIG. 8. The data showed that the carboxamide solvents provided superior wet scrub resistance compared to comparative solvents Solvent A and Solvent B.

Figure 9:
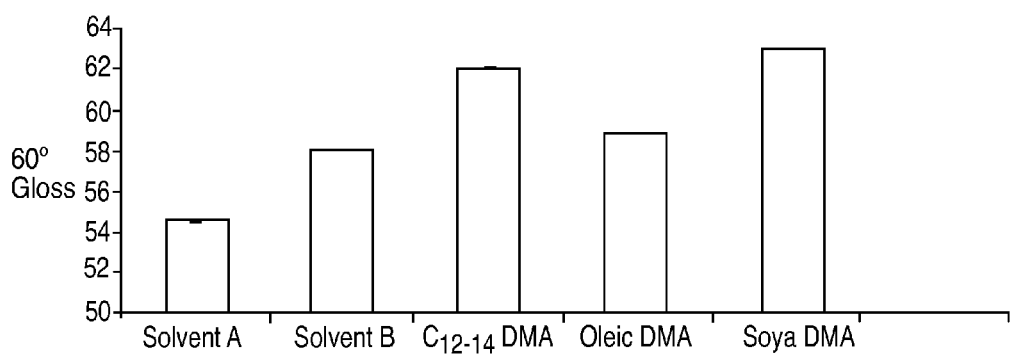
FIG. 9 is a bar chart comparing gloss values for paint samples made from five different coalescing solvents as described in Example 22 herein. The results showed that three carboxamide coalescing solvents, $C_{12-14}$ DMA, Oleic DMA, and Soya DMA, showed improved gloss development compared to two comparative coalescing solvents.

Gloss: 60 degree gloss values were determined for each of the coatings that had been coated onto the Leneta plastic scrub panels as described in Example 19. The results are shown in FIG. 9 which shows superior gloss development for the carboxamide solvents as compared to comparative Solvent A and Solvent B.

Example 23

Latex Coalescence by Minimum Film Forming Temperature (MFFT). Comparison of Substituted Lactams to Control Coalescing Solvents A styrene acrylic latex was prepared by a semi-batch free radical polymerization of methyl methacrylate, butyl acrylate, styrene and acrylic acid at 34, 20, 44 and 2 parts, by wt., respectively using a conventional free radical initiator and anionic surfactant. The latex had a particle size distribution, as determined by light scattering, of 187 nm and solids of 47%. With mixing, 0.5 grams of four solvents was added to four 20 grams aliquots of the styrene acrylic latex. The coalescing solvents compared were Solvent A; 1-(2-ethylhexyl)-5-oxo-3-pyrrolidinecarboxylic acid butyl ester; 1-(2-ethylhexyl)-5-oxo-3-pyrrolidinecarboxylic acid hexyl ester and $C_{12-14}$ DMA. Wet films of the four blends were cast onto the surface of the Rhopoint MFFT 90 as described in Test Methods. The surface temperature gradient was controlled from 0 to 18° C. and dried as described in Test Methods. The results indicated all four of the solvents lowered the MFFT of the latex to 6° C.

Example 24

Preparation of Latex Containing Coalescing Carboxamide Solvent in the Monomer Phase of the Emulsion Polymerization Into a 2-L round bottomed flask were charged 0.5 g (0.1 weight % BOM) of sodium bicarbonate, 220 g DI water, and 30 g (2.2 weight % BOM on an active basis) of an acrylic seed latex (particle size ca. 50 nm). A monomer emulsion containing EHEHA carboxamide solvent with the following formulation was prepared:
  0.5 grams BOM SDS
  150 grams DI water
The monomer composition comprised:
  2.9 grams EHEHA
  45.7 grams butyl acrylate
  49.5 grams methyl methacrylate
  1.9 grams methacrylic acid A monomer emulsion feed was prepared by the addition of monomer phase to the SDS containing aqueous phase with mixing at 600 RPM using a 5 cm diameter turbine mixing head with four blades. After 15 min. of mixing, the monomer emulsion was stable. The 2 L reaction flask was healed to a temperature of 83° C. at a stirring rate of 150 rpm, under a nitrogen blanket. A 20 g solution of 0.2 weight % BOM initiator (ammonium persulfate) was added to the flask, and the monomer emulsion was fed at a constant rate for 180 minutes. After 10 minutes of monomer addition, a 79 g solution of 0.5 weight % BOM ammonium persulfate and 0.5 weight % BOM sodium bicarbonate was fed for 180 minutes. After completing the monomer emulsion feed, the temperature was held for 60 minutes before cooling to room temperature (approximately 25° C.). After cooling the latex was neutralized with ammonium hydroxide to a pH value between about 8.0 and about 8.5. The latex was filtered through a 100 mesh (0.149 mm) screen. Latex solids were about 45 weight %. The final particle size was approximately 230 nm as measured by light scattering.

A control latex was also made in an identical manner but without the use of coalescing solvent.

MFFT was determined using a Rhopoint MFFT 90 instrument by the same method as described in Example 14 and under Test Methods. The MFFT temperature of the latex was lowered from 12° C. (control) to 6.4° C.

Example 25

Comparison of Wet-Scrub Resistance of Coalescing Solvents in Paint Formulations on Alkyd Paint A master batch of paint was prepared as described in Example 19 using the Rhoplex™ SG-20 acrylic latex supplied by Rohm & Haas at 46% solids. The paint master batch was then divided into three 240 gram portions into 400 ml beakers and mixed between 800 and 850 rpm. 2.3 grams of 1-(2-ethylhexyl)-5-oxo-3-pyrrolidinecarboxylic acid 2-ethylhexyl ester, 1-(2-ethylhexyl)-5-oxo-3-pyrrolidinecarboxylic acid hexyl ester or Solvent A were then added to each beaker. About 1.1 grams of Acrysol® SCT-275 was added to each paint formulation to achieve the target KU viscosity range. The formulated paints were mixed for 10 minutes and stored for 24 hours to allow for viscosity development, after which the Stormer viscosities were determined to be between 92 and 96 KU. The final properties of the paints were 49% solids, pH 8.5 and calculated 23% P.V.C. The final formulated sample paints were applied to aged alkyd panels using a 13 cm wide, 7 mil (0.17 mm) wet film applicator. The alkyd panels were prepared by coating tinted Glidden Ultra-Hide® Alkyd Gloss Enamel onto black Leneta plastic scrub panels and cured for four days at 50° C. The paints were coated in triplicate on separate alkyd panels and dried for seven days. The dried coatings were then cut into strips measuring 16.5 cm×5.7 cm (2 per drawdown). Wet scrub resistance evaluations based on a modified version of ASTM-2486-00 were performed for each of the paint coatings. Two samples at a time were placed on the scrub tester with approximately a 2" (5 cm) gap between the samples, and taped to secure panels to the machine. A spacer was placed over the samples to maintain the scrub brush pathway and further secure the samples. An 8 cm×3 cm scrub brush, preconditioned in room temperature water, was inserted into the holder. 10 grams of standard abrasive scrub compound was applied evenly to the brush. 5 grams of water was placed into the gap between the samples. Samples were tested to 800 scrub cycles. The scrubbed samples were then rinsed in tepid water, dried approximately 24 hours, and then weighed. All three of the coatings had a weight loss of 2.1% indicating the two low VOC carboxamide solvents had a scrub resistance as good as the fugitive comparative Solvent A solvent.

Example 26

Use of a Polyunsaturated Reactive Carboxamide Solvent in Alkyd Resin to Lower VOC and Comparison with a Comparative High VOC Coalescing Solvent Based System A long oil alkyd resin was produced by charging into a 1 liter resin kettle equipped with a reflux condenser, Dean-Stark (DS) tube, thermocouple, heating mantle and stainless steel agitator, 92.6 grams glycerol. 441 grams soybean oil and 0.25 g Fascat™ 4201 esterification catalyst. The mixture was then heated to 250° C. and held at that temperature for 1 hour, followed by cooling to 160° C. 211 grams of isophthalic acid (Akcros Chemicals) was added and the mixture then heated to 225° C. Water began to collect from condensation reaction in the DS tube at 235° C., and heating continued to 250° C. over a period of about 4 hours until an acid number of 14.2 mg KOH/gram was achieved. A total of 45 grams water was driven off. The reaction mixture was cooled to 50° C. and then transferred to a sample jar. The resultant resin was then blended with various solvents to produce a workable clear coat with reduced VOC content.

A solvent-borne control clear coat was produced by dissolving 100 grams of resin in 4 grams of mixed xylenes (400 g/liter of VOC), designated Control 1.

Secondly, a reduced VOC control clear coat composition was made with comparative low VOC solvent Example 2 by dissolving 100 grams of resin in 3 grams xylene and adding 1 gram of Example 2 solvent (300 g/liter VOC). This preparation was designated Control 2.

Thirdly, a reduced VOC composition was prepared in a like manner but by adding 1 g of dehydrated ricinoleic acid (DHRA) instead.

To each sample was added 400 ppm of a 6% solution (in mineral oil) of cobalt naphthenate oxidative catalyst. 3 mil (0.075 mm) films of each formulation were cast onto black Leneta P-121-10N panels. The films were then cured under ambient conditions for 1 week. Hardness was determined using a pencil hardness test. The panels were scratched with pencils of different hardness, starting with the hardest lead, until no scratches appeared on the coated panels. The hardest lead that did not scratch the coating was recorded as the hardness. The hardness scale is as follows, from soft to hard: 3B-2B-B-HB-F-H-2H. The hardness values for Control 1, Control 2 and DHRA were HB, 2B and HB, respectively showing that the reactive solvent, DHRA, produced a harder film compared to the non-reactive Control 2 solvent.

Example 27

Evaluation of Carboxamide Coalescing Solvents in Floor Care Formulations

A base floor care formulation as shown in Table 1 was utilized. Oleic DMA solvent, Solvent D, and Solvent E were added to the base formulation according to Table 1. A Polymer/ASR/Wax weight ratio of 80/5/15 was maintained. The formulations were blended in the order given in Table 1.

Testing was done by applying the coating to a NP121-10N Leneta panel with a Shur line trim brush as follows: The brush was pretreated with water and dried with a paper towel (the brush remained slightly damp). 2 mL of coating was added to the panels with a syringe, immediately followed by a side-by side application motion with the brush and then a downward stroke pattern (49 sq. in. coverage). Two replicates were performed per coating. The coating was dried for 2 hours, followed by a 60/20° gloss measurement. The results in Table 1 indicate that improvements in gloss development and in leveling characteristics rating were achieved by replacing two comparative coalescing solvents, Examples E and D, with a carboxamide solvent Oleic DMA.

TABLE 1

Evaluation of Oleic DMA Solvent in Floor Care Formulations

| | Floor Coating Formulations | | | | | | | | |
|---|---|---|---|---|---|---|---|---|---|
| | A | | | B | | | C | | |
| | % | Lbs. | Gallon | % | Lbs. | Gallon | % | Lbs. | Gallon |
| Floor Care Base Formulation | | | | | | | | | |
| Water | 44.17 | 376.30 | 45.08 | 44.17 | 376.70 | 45.11 | 44.17 | 377.08 | 45.17 |
| KATHON ™ CG/ICP (1.5%) | 0.04 | 0.30 | 0.04 | 0.04 | 0.30 | 0.04 | 0.04 | 0.34 | 0.04 |
| Zonyl FSJ | 1.28 | 10.90 | 1.31 | 1.28 | 10.90 | 1.31 | 1.28 | 10.93 | 1.31 |
| Isodecyl benzoate | 0.80 | 6.80 | 0.73 | 0.80 | 6.80 | 0.73 | 0.80 | 6.83 | 0.73 |
| Tributoxy Ethyl Phosphate | 2.00 | 17.00 | 2.00 | 2.00 | 17.10 | 2.02 | 2.00 | 17.07 | 2.01 |
| DURAPLUS ™ MP (38%) | 36.31 | 309.40 | 35.17 | 36.31 | 309.70 | 35.20 | 36.31 | 309.98 | 35.23 |
| Michem ™ MD-91530 (30%) | 2.87 | 24.50 | 2.78 | 2.87 | 24.50 | 2.78 | 2.87 | 24.50 | 2.78 |
| Michem ME-93235 (35%) | 3.70 | 31.50 | 3.77 | 3.70 | 31.60 | 3.78 | 3.70 | 31.59 | 3.78 |
| Michem ME-94340 (40%) | 3.23 | 27.50 | 3.29 | 3.23 | 27.50 | 3.29 | 3.23 | 27.57 | 3.30 |
| Coalescing Solvents | | | | | | | | | |
| Solvent D | 4.80 | 40.90 | 4.95 | 4.80 | 40.90 | 4.95 | — | — | — |
| Solvent E | 0.80 | 6.80 | 0.88 | — | — | — | 0.80 | 6.83 | 0.88 |
| Oleic DMA | — | 0.00 | 0.00 | 0.80 | 6.80 | 0.79 | 4.80 | 40.98 | 4.77 |
| Total | 100.00 | 851.90 | 100.00 | 100.00 | 852.80 | 100.00 | 100.00 | 853.70 | 100.00 |
| Theoretical Non-Volatile Solids, % | 20 | VOCg/L | 264 | 20 | VOCg/L | 231 | 25 | VOCg/L | 73 |
| Density, Lbs./Gallon (US) | 8.52 | | | 8.53 | | | 8.54 | | |
| Polymer/ASR/Wax Ratio | 80/5/15 | | | 80/5/15 | | | 80/5/15 | | |
| Gloss Development | | | | | | | | | |
| | | | | Coat 1 | | | | | |
| 60° | | 24 | | | 45 | | | 40 | |
| 20° | | 6 | | | 10 | | | 7 | |
| Comments | | good leveling | | | excellent leveling | | | excellent leveling | |

What is claimed is:

1. A film forming composition comprising
(i) a latex comprising polymer particles dispersed in a water phase;
(ii) at least one carboxamide selected from the group consisting of:

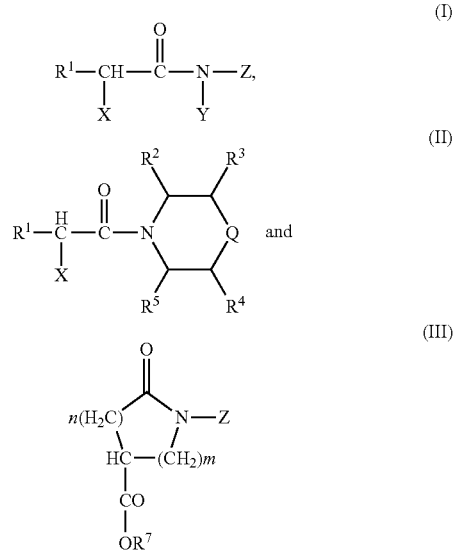

wherein:
$R^1$, X, Y and Z are the same or different and are independently selected from the group consisting of hydrogen and an optionally substituted straight-chain, branched or cyclic, saturated or unsaturated hydrocarbyl group or heterohydrocarbyl group having from 1 to about 25 carbon atoms, with the proviso that at least one of $R^1$, X, Y and Z is not hydrogen;
$R^2$, $R^3$, $R^4$ and $R^5$ are each independently selected from hydrogen and a hydrocarbyl group of from 1 to 8 carbon atoms;
Q is selected from the group consisting of O, S and N—$R^6$;
wherein $R^6$ is selected from the group consisting of hydrogen and an optionally substituted straight-chain, branched or cyclic, saturated or unsaturated hydrocarbyl group or heterohydrocarbyl group having from 1 to about 25 carbon atoms;
$R^7$ is an optionally substituted straight-chain, branched or cyclic, saturated or unsaturated hydrocarbyl group of from 1 to 12 carbon atoms;
n and m are the same or different and are zero, 1, 2, 3 or 4; and
m+n is from 2 to 4 (iii) a pigment;
wherein the latex of the film forming composition exhibits a minimum film forming temperature of less than 20° C., and the composition has a latex to pigment weight ratio of at least 0.5.

2. The film forming composition of claim 1, wherein the at least one carboxamide is selected from the group consisting of N,N-dimethyl isostearoylamide, N,N-dimethyl $C_{12-14}$ alkanoylamide, N,N-dimethyl oleoylamide, N,N-diethyl $C_{12-14}$ alkanoylamide, N-(2-ethylhexyl) $C_{10}$ alkanoylamide, N-(2-ethylhexyl) 2-ethylhexyl alkanoylamide, and mixtures of any two or more thereof.

3. The film forming composition of claim 1, wherein the at least one carboxamide is N,N-dimethyl amide obtained from vegetable oil, vegetable oil-derived fatty acids, vegetable oil-derived fatty acid methyl esters or mixtures of any two or more thereof.

4. The film forming composition of claim 3, wherein the vegetable oil is selected from the group consisting of soybean oil, linseed oil, safflower oil, palm oil, corn oil, castor oil, coconut oil, tall oil, tung oil, and mixtures of any two or more thereof.

5. The film forming composition of claim 1, wherein the at least one carboxamide is obtained from tallow.

6. The film forming composition of claim 1, wherein the at least one carboxamide is N,N-dimethyl amide obtained from a member selected from the group consisting of dehydrated ricinoleic acid glycerol ester, dehydrated ricinoleic acid and dehydrated ricinoleic acid methyl ester.

7. The film forming composition of claim 1, wherein the at least one carboxamide is an unsaturated fatty acid amide.

8. The film forming composition of claim 7, wherein the unsaturated fatty acid amide is selected from the group consisting of oleic acid amide, linoleic acid amide, linolenic acid amide, and combinations of any two or more thereof.

9. The film forming composition of claim 1, wherein the at least one carboxamide is 1-(4-morpholinyl)-1-dodecanone.

10. The film forming composition of claim 1, wherein the at least one carboxamide is selected from the group consisting of 1-(2-ethylhexyl)-5-oxo-3-pyrrolidinecarboxylic acid hexyl ester, 1-(2-ethylhexyl)-5-oxo-3-pyrrolidinecarboxylic acid butyl ester, and 1-(2-ethylhexyl)-5-oxo-3-pyrrolidinecarboxylic acid 2-ethylhexylhexyl ester.

11. The film forming composition of claim 1, wherein the latex comprises polymers and/or copolymers obtained from members selected from the group consisting of alkyl acrylates, alkyl methacrylates, vinyl acetates, styrene, butylene, isoprene, styrene-butadiene, acrylonitrile, vinyl acrylics, silicones, vinyl chlorides, vinyl acetate-ethylene, styrene-acrylics, ethylene, and combinations thereof.

12. The film forming composition of claim 1 comprising from about 0.2 to about 10 parts by weight of the at least one carboxamide, based on 100 parts by weight of the latex.

13. The film forming composition of claim 1 further comprising a pigment, dye or combination thereof.

14. The film forming composition of claim 13, wherein the pigment is a member selected from the group consisting of titanium dioxide, zinc oxide, calcium carbonate, aluminum oxide, aluminum silicate, silica, clay and combinations thereof.

15. The film forming composition of claim 1 further comprising at least one additional component.

16. The film forming composition of claim 15, wherein the at least one additional component is selected from the group consisting of defoamers, dispersants, surfactants, thickeners, biocides, co-solvents, base, corrosion inhibitors, wetting agents, resins, metal crosslinkers, and waxes.

17. The film forming composition of claim 1, wherein the film forming composition exhibits a minimum film forming temperature of less than 15° C.

18. A method of forming a film comprising applying the film forming composition according to claim 1 to a substrate at ambient temperature.

19. A method for improving wet-scrub resistance, block resistance, gloss development, dirt pick-up resistance, and leveling characteristics of a film formed from a latex comprising applying the film forming composition according to claim 1 to a substrate at ambient temperature.

20. A paint comprising the film forming composition according to claim 1.

21. A floor care formulation comprising the film forming composition according to claim 1.

22. A liquid adhesive formulation comprising the film forming composition according to claim 1.

23. A caulk product comprising the film forming composition according to claim 1.

* * * * *